United States Patent
Ji et al.

(10) Patent No.: US 8,818,203 B2
(45) Date of Patent: Aug. 26, 2014

(54) OPTICAL MODULATOR WITH REDUCED SIZE AND OPTICAL TRANSMITTER INCLUDING THE SAME

(75) Inventors: Ho-Chul Ji, Yongin-si (KR); Kyoung Ho Ha, Seoul (KR); Dong Jae Shin, Seoul (KR); Jung Hyung Pyo, Seoul (KR); Kwang Hyun Lee, Gyeonggi-do (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 260 days.

(21) Appl. No.: 13/313,532

(22) Filed: Dec. 7, 2011

(65) Prior Publication Data

US 2012/0155888 A1 Jun. 21, 2012

(30) Foreign Application Priority Data

Dec. 17, 2010 (KR) .................. 10-2010-0130323

(51) Int. Cl.
  *H04B 10/04* (2006.01)
  *G02B 6/30* (2006.01)
  *G02F 1/225* (2006.01)

(52) U.S. Cl.
  CPC *G02B 6/305* (2013.01); *G02B 6/30* (2013.01); *G02F 2201/307* (2013.01); *G02F 1/225* (2013.01)
  USPC ........... 398/182; 398/183; 398/184; 398/185; 398/186; 398/187; 398/188; 398/189; 398/190; 398/191; 398/192

(58) Field of Classification Search
  CPC .... H04B 10/505; H04B 10/504; H04B 10/58; H04B 10/50; H04B 10/502
  USPC .................................................. 398/182–189
  See application file for complete search history.

(56) References Cited

U.S. PATENT DOCUMENTS

| | | | | |
|---|---|---|---|---|
| 3,760,292 A | * | 9/1973 | Kogelnik et al. | 372/96 |
| 4,273,411 A | * | 6/1981 | Alferness | 385/40 |
| 5,069,520 A | * | 12/1991 | Calvani et al. | 385/1 |
| 5,621,839 A | * | 4/1997 | Asano et al. | 385/129 |
| 5,648,978 A | * | 7/1997 | Sakata | 372/50.11 |
| 5,721,796 A | * | 2/1998 | de Barros et al. | 385/37 |
| 6,201,909 B1 | * | 3/2001 | Kewitsch et al. | 385/37 |
| 6,243,517 B1 | * | 6/2001 | Deacon | 385/50 |

(Continued)

FOREIGN PATENT DOCUMENTS

| | | |
|---|---|---|
| JP | 10-186166 | 7/1998 |
| JP | 2003-232932 | 8/2003 |
| JP | 2004-159215 | 6/2004 |

*Primary Examiner* — Ken Vanderpuye
*Assistant Examiner* — Abbas H Alagheband
(74) *Attorney, Agent, or Firm* — F. Chau & Associates, LLC

(57) ABSTRACT

An optical modulator includes a light input/output unit receiving an incident optical signal which has not been modulated, splitting the incident optical signal into a first optical signal and a second optical signal, and transmitting the first and second optical signals to a first path and a second path, respectively, of an optical waveguide. A phase shifter is positioned in at least one of the first and second paths and modulates a phase of at least one of the first and second optical signals, which have been received through the first and second paths, respectively, in response to an electrical signal. A phase-modulated signal is output. A reflective grating coupler reflects signals respectively received through the first and second paths back along the first and second paths respectively.

11 Claims, 36 Drawing Sheets

(56) References Cited

U.S. PATENT DOCUMENTS

| | | | |
|---|---|---|---|
| 6,282,005 B1* | 8/2001 | Thompson et al. | 398/143 |
| 6,324,204 B1* | 11/2001 | Deacon | 372/96 |
| 6,529,646 B1* | 3/2003 | Wight et al. | 385/1 |
| 6,850,713 B2* | 2/2005 | Kikuchi et al. | 398/201 |
| 7,653,317 B2* | 1/2010 | Ohki et al. | 398/192 |
| 8,105,758 B2* | 1/2012 | Barwicz et al. | 430/311 |
| 2001/0009594 A1* | 7/2001 | Hosoi | 385/2 |
| 2002/0028045 A1* | 3/2002 | Yoshimura et al. | 385/50 |
| 2002/0080469 A1* | 6/2002 | Leuthold | 359/326 |
| 2002/0136259 A1* | 9/2002 | Evans | 372/102 |
| 2003/0053731 A1* | 3/2003 | Bhowmik | 385/3 |
| 2003/0152323 A1* | 8/2003 | Wakabayashi et al. | 385/27 |
| 2004/0071404 A1* | 4/2004 | Masalkar | 385/48 |
| 2005/0147348 A1* | 7/2005 | Grunnet-Jepsen et al. | 385/37 |
| 2006/0008223 A1* | 1/2006 | Gunn et al. | 385/129 |
| 2008/0138088 A1* | 6/2008 | Welch et al. | 398/183 |
| 2009/0003841 A1* | 1/2009 | Ghidini et al. | 398/186 |
| 2009/0067771 A1* | 3/2009 | Chen et al. | 385/3 |
| 2010/0060972 A1* | 3/2010 | Kucharski et al. | 359/290 |
| 2010/0142878 A1* | 6/2010 | Park et al. | 385/2 |
| 2010/0187442 A1* | 7/2010 | Hochberg et al. | 250/492.1 |
| 2011/0052114 A1* | 3/2011 | Bernasconi et al. | 385/3 |
| 2011/0069925 A1* | 3/2011 | Zheng et al. | 385/14 |
| 2011/0075970 A1* | 3/2011 | Schrauwen et al. | 385/37 |
| 2011/0076032 A1* | 3/2011 | Verma et al. | 398/186 |
| 2011/0133063 A1* | 6/2011 | Ji et al. | 250/227.24 |

* cited by examiner

OPTICAL MODULATOR WITH REDUCED SIZE AND OPTICAL TRANSMITTER INCLUDING THE SAME

CROSS-REFERENCE TO RELATED APPLICATIONS

This application claims priority under 35 U.S.C. §119(a) from Korean Patent Application No. 10-2010-0130323 filed on Dec. 17, 2010, the disclosure of which is hereby incorporated by reference in its entirety.

BACKGROUND

1. Technical Field

The present invention relates to an optical modulator, and more particularly, to an optical modulator with a reduced size and an optical transmitter including the same.

Ring-type optical modulators may be suggested to reduce the size of an optical modulator. However, the stability of ring-type optical modulators may be adversely affected by temperature.

Mach-Zehnder optical modulators may be more stable than ring-type optical modulators. However, since the Mach-Zehnder optical modulator includes a relatively large Y-splitter at each of both ends, Mach-Zehnder optical modulators may be relatively large.

SUMMARY

According to some exemplary embodiments of the present invention, there is provided an optical modulator including a light input unit configured to receive an incident optical signal, which has not been modulated. The incident optical signal is split into a first optical signal and a second optical signal. The first and second optical signals are transmitted to a first path and a second path, respectively, positioned in both directions, respectively, of an optical waveguide. A phase shifter is configured to be positioned in at least one of the first and second paths and to modulate a phase of at least one of the first and second optical signals, which have been received through the first and second paths, respectively, in response to an electrical signal. A light output unit is configured to combine a signal received through the first path and a signal received through the second path and to generate an output optical signal. Here, at least one unit among the light input unit and the light output unit may include a vertical grating coupler.

The light input unit may include a first vertical grating coupler configured to receive the incident optical signal in a direction vertical to the both directions of the optical waveguide and to transmit the first optical signal and the second optical signal in the both directions, respectively, with equivalent proportions.

Alternatively, the light input unit may include a first vertical grating coupler configured to receive the incident optical signal in a direction vertical to both directions of the optical waveguide and to transmit the first optical signal and the second optical signal in the both directions, respectively, with different proportions.

The electrical signal may include a first electrical signal. The phase shifter may include a first phase shifter configured to be positioned in the first path and to shift the phase of the first optical signal by a first angle in response to the first electrical signal.

The electrical signal may further include a second electrical signal. The phase shifter may further include a second phase shifter configured to be positioned in the second path and to shift the phase of the second optical signal by a second angle in response to the second electrical signal.

The light output unit may include a second vertical grating coupler configured to combine the second optical signal with a phase-modulated signal output from the first phase shifter and to output the output optical signal in a direction vertical to a direction in which the second optical signal and the phase-modulated signal are input to the light output unit.

According to exemplary embodiments of the present invention, there is provided an optical modulator including a light input/output unit configured to receive an incident optical signal, which has not been modulated. The incident optical signal is split into a first optical signal and a second optical signal. The first and second optical signals are transmitted to a first path and a second path, respectively, of an optical waveguide. A phase shifter is configured to be positioned in at least one of the first and second paths, to modulate a phase of at least one of the first and second optical signals, which have been received through the first and second paths, respectively, in response to an electrical signal, and to output a phase-modulated signal. A reflective grating coupler is configured to reflect a signal received through the first path back to the first path and to reflect a signal received through the second path back to the second path.

According to exemplary embodiments of the present invention, there is provided an optical modulator including a vertical grating coupler configured to receive an incident optical signal, which has not been modulated, to split the incident optical signal into a first optical signal and a second optical signal, and to transmit the first and second optical signals to a first path and a second path, respectively, of an optical waveguide. A phase shifter is configured to be positioned in at least one of the first and second paths and to modulate a phase of at least one of the first and second optical signals, which have been received through the first and second paths, respectively, in response to an electrical signal. A first reflective grating coupler is configured to receive a signal received through the first path and to reflect the signal back to the first path. A second reflective grating coupler is configured to receive a signal received through the second path and to reflect the signal back to the second path.

According to exemplary embodiments of the present invention, there is provided an optical modulator including a vertical grating coupler configured to receive an optical signal in a direction vertical to a plane along which the optical signal will be output to an optical waveguide, to split a first polarized light of the optical signal into first and third paths among first through fourth paths in the optical waveguide, and to split a second polarized light of the optical signal into the second and fourth paths. A first phase shifter is configured to be positioned in the first path and to modulate a phase of an optical signal received through the first path. A second phase shifter is configured to be positioned in the second path and to modulate a phase of an optical signal received through the second path. First through fourth reflective grating couplers are configured to respectively reflect optical signals respectively received through the first through fourth paths back to the first through fourth paths, respectively.

According to exemplary embodiments of the present invention, there is provided an optical modulator including a vertical grating coupler configured to receive an optical signal in a direction vertical to a plane along which the optical signal will be output to an optical waveguide. The vertical grating coupler splits a first polarized light of the optical signal into first and third paths among first through fourth paths in the optical waveguide and splits a second polarized light of the optical signal into the second and fourth paths. A first phase shifter is configured to be positioned in the first path and to modulate a phase of an optical signal received through the first path. A second phase shifter is configured to be positioned in the second path and to modulate a phase of an optical signal received through the second path. A first reflective grating coupler is configured to reflect optical signals respectively received through the first and third paths back to the first and third paths, respectively. A second reflective grating coupler is configured to reflect optical signals respectively received through the second and fourth paths back to the second and fourth paths, respectively.

BRIEF DESCRIPTION OF THE DRAWINGS

The above and other features and aspects of exemplary embodiments of the present invention will become more apparent by describing in detail the exemplary embodiments with reference to the attached drawings in which.

DETAILED DESCRIPTION OF THE EMBODIMENTS

Figure 1:
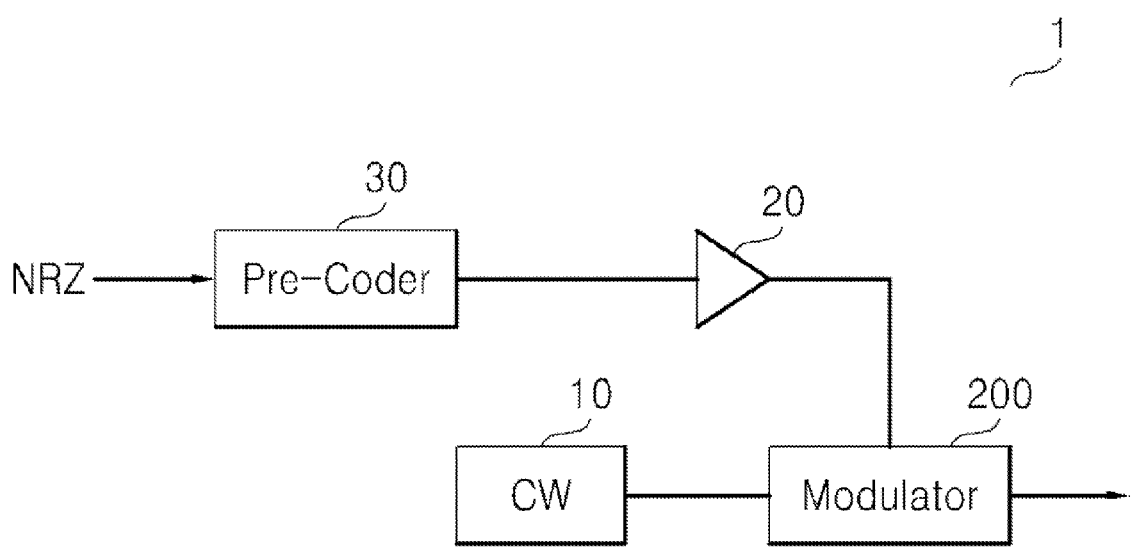
FIG. 1 is a diagram of an optical transmitter according to exemplary embodiments of the present invention.

Exemplary embodiments of the present invention will be described more fully hereinafter with reference to the accompanying drawings. This invention may, however, be embodied in many different forms and should not be construed as limited to the embodiments set forth herein. In the drawings, the size and relative sizes of layers and regions may be exaggerated for clarity. Like numbers may refer to like elements throughout.

It will be understood that when an element is referred to as being "connected" or "coupled" to another element, it can be directly connected or coupled to the other element or intervening elements may be present.

FIG. 1 is a diagram of an optical transmitter 1 according to exemplary embodiments of the present invention. The optical transmitter 1 includes a light source 10, which may be, for example, a continuous wave (CW) laser, an optical modulator driver 20, a pre-coder 30, and an optical modulator 200.

The pre-coder 30 pre-encodes a non-return-to-zero (NRZ) electrical signal and outputs a pre-encoded signal to the optical modulator driver 20. The optical modulator driver 20 amplifies the pre-encoded signal and outputs an amplified signal to the optical modulator 200. The NRZ electrical signal may be a binary data signal. The pre-coder 30 may be formed using, for example, a 1-bit delay element and an exclusive-OR element.

The optical modulator 200 modulates the intensity and the phase of light received from the light source 10 according to the amplified signal, e.g., the electrical signal. A bias position of the optical modulator 200 may then be set at a null point corresponding to a minimum value in a transfer characteristic function of the optical modulator 200.

The optical modulator 200 may also split a modulated optical signal into a first and a second optical signal, delay the first optical signal, for example, by about 0.5 bit (e.g., 180 degrees), and output an optical signal obtained by combining the first delayed optical signal and the second optical signal so that they destructively interfere. Alternatively, the optical modulator 200 may output an optical signal obtained by combining the first optical signal and the second optical signal so that they constructively interfere. Examples of suitable optical modulators 200 according to exemplary embodiments of the present invention are described in detail below.

Figure 2:
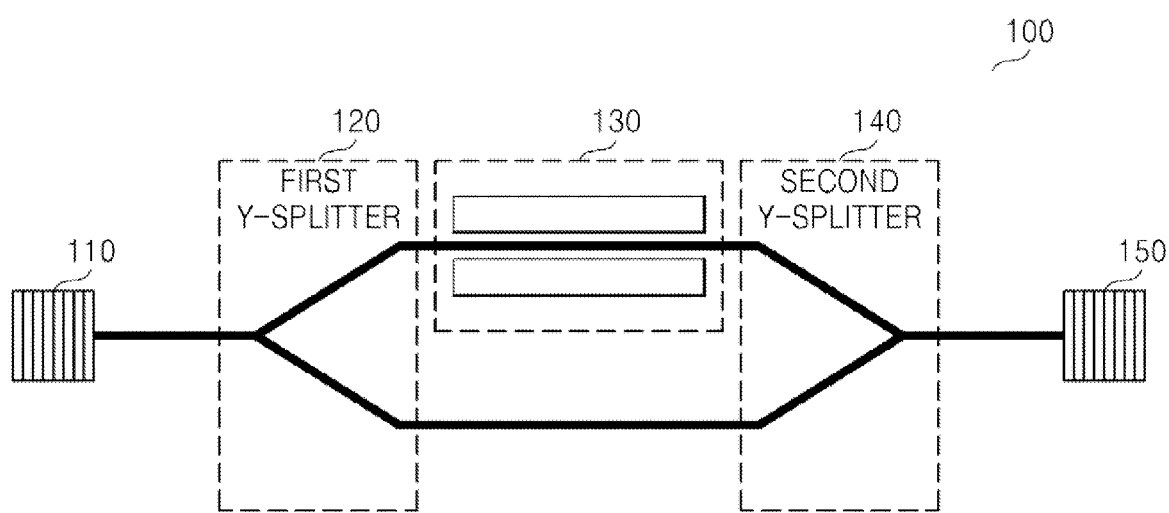
FIG. 2 is a diagram of an optical modulator.

FIG. 2 is a diagram of an optical modulator 100. Referring to FIG. 2, the optical modulator 100 includes an input terminal 110, a first Y-splitter 120, a phase shifter 130, a second Y-splitter 140, and an output terminal 150.

The input terminal 110 is connected to an optical fiber to enable light to be input to the optical modulator 100. The output terminal 150 is also connected to an optical fiber to enable modulated light to be output from the optical modulator 100.

The first Y-splitter 120 is a passive element that splits light input through the input terminal 110. For example, the first Y-splitter 120 may split an optical signal input through the input terminal 110 at a ratio of 1 to 1. The splitting angle of the first Y-splitter 120 may be random.

The phase shifter 130 may shift the phase of a signal in one of two branches, into which the optical signal is split by the first Y-splitter 120, using an electrical signal input through the optical modulator driver 20.

The second Y-splitter 140 is a passive element that combines or overlaps an optical signal transmitted from the phase shifter 130 with an optical signal transmitted from the first Y-splitter 120. The optical signals may destructively or constructively interfere through the overlapping. The splitting angle of the second Y-splitter 140 may be random.

Since the first Y-splitter 120 and the second Y-splitter 140 are passive elements, it may be difficult to reduce the size of the optical modulator 100.

Figure 3A:
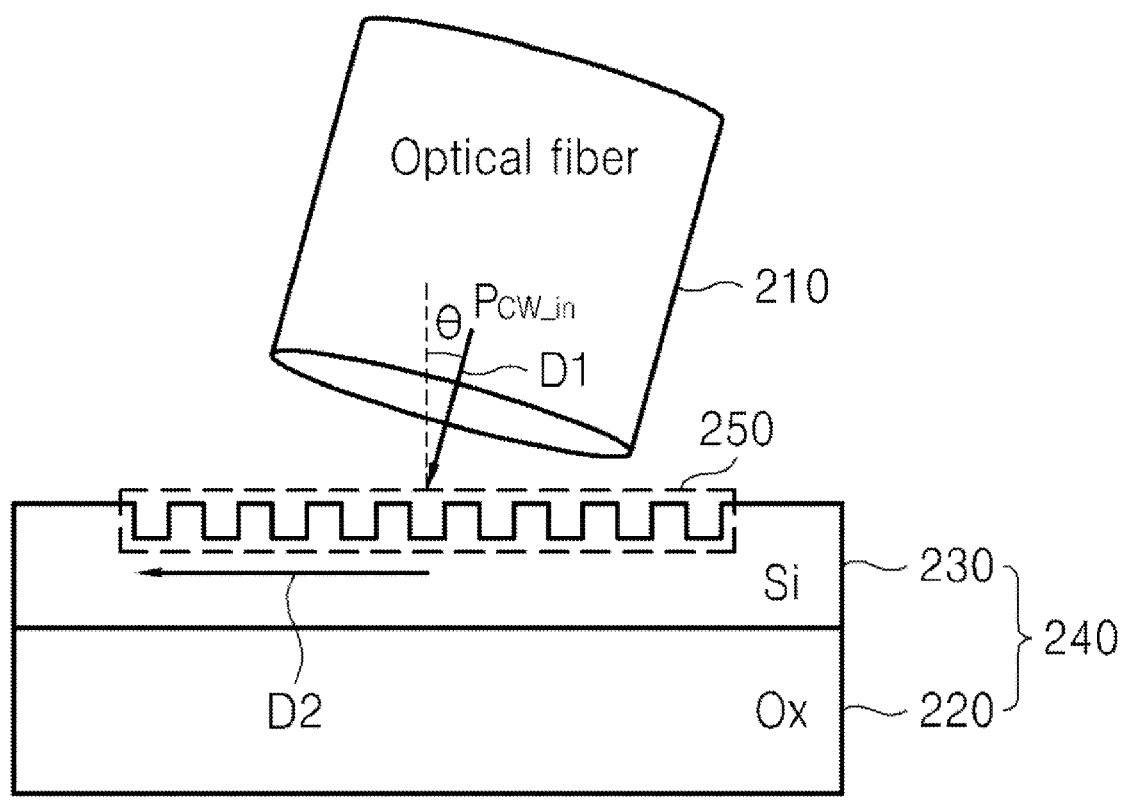
FIGS. 3A and 3C are diagrams explaining a first optical interface between an optical fiber and an optical waveguide according to exemplary embodiments of the present invention.
Figure 3B:
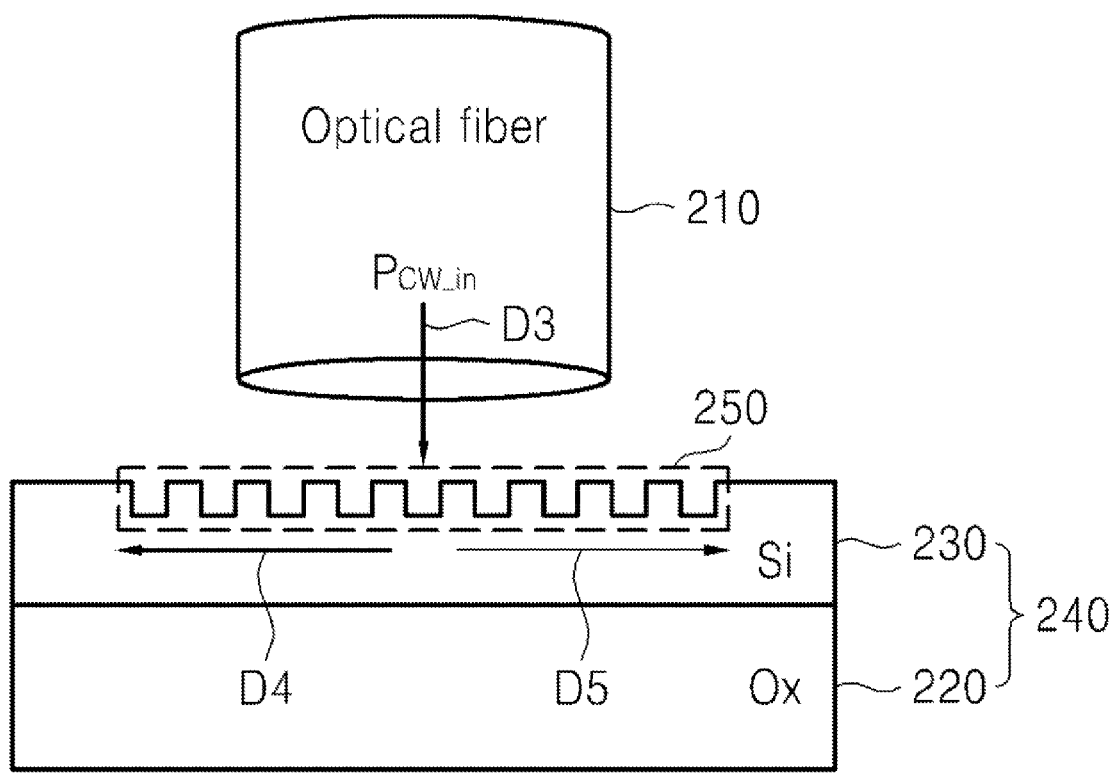
FIGS. 3B and 3D are diagrams explaining a second optical interface between the optical fiber and the optical waveguide according to exemplary embodiments of the present invention.
Figure 3C:
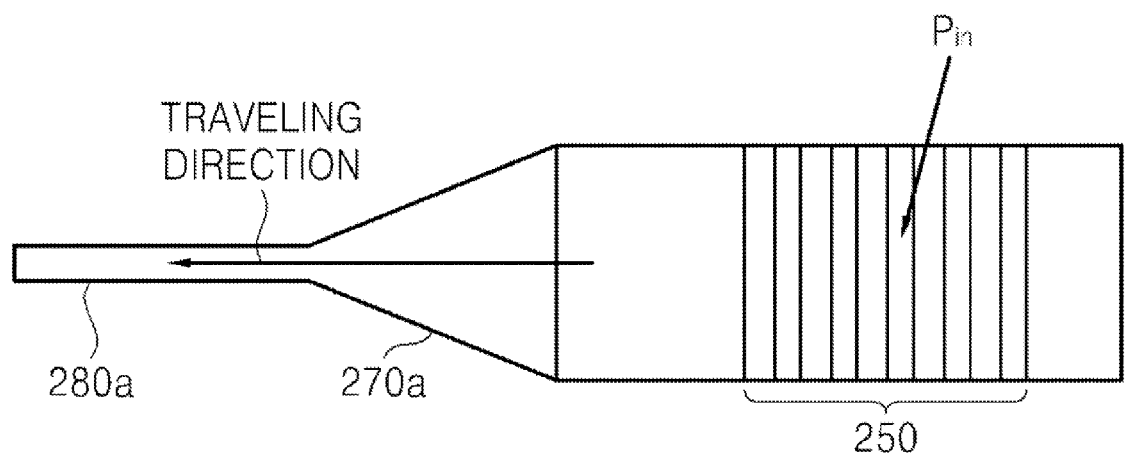

FIGS. 3A and 3C are diagrams explaining a first optical interface between an optical fiber 210 and an optical waveguide 240 according to exemplary embodiments of the present invention. Referring to FIGS. 3A and 3C, the optical waveguide 240 includes an oxide layer 220 and a silicon layer 230. The silicon layer 230 has a light receiving portion 250. The light receiving portion 250 receives light through an optical fiber 210. The light receiving portion 250 may be shaped in a ribbed pattern. The incident light is input to the silicon layer 230 by adjusting the gap between and the depth of the ribs of the light receiving pattern 250. The light input to the silicon layer 230 travels with total reflection since the silicon layer 230 has a higher refractive index than the oxide layer 220. The silicon layer 230 corresponds to a core layer and the oxide layer 220 corresponds to a cladding layer. Although not shown in FIG. 3A, the top of the silicon layer 230 may be covered with a cladding layer (e.g., an oxide layer).

Referring to FIG. 3A, the first light interface positions the optical fiber 210 at an angle of θ with respect to a vertical direction of the optical waveguide 240. The direction that the optical fiber 210 meets the optical waveguide 240 at may dictate a direction in which an optical signal will be transmitted and may dictate a direction in which the optical signal travels in the optical waveguide 240. For example, when the angle of θ is given so that incident light $P_{CW\_in}$ is input to the optical waveguide 240 in a first direction D1, the light $P_{CW\_in}$ travels in a second direction D2 in the optical waveguide 240. The angle of θ may be within the range of 8 to 10 degrees, but it is not restricted thereto.

As described above, when the first light interface is used, an incident light signal travels in a single direction, and therefore, as illustrated in FIG. 3C an optical waveguide 280a may also be formed in a single direction. A taper 270a may be provided between the light receiving portion 250 and the optical waveguide 280a to connect them. The first light interface having the structure illustrated in FIGS. 3A and 3C is referred to as a slanted grating coupler.

Figure 3D:
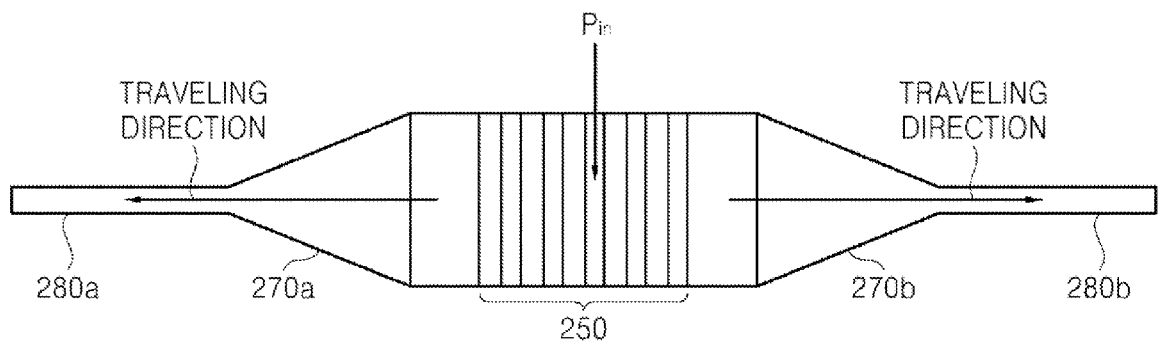

FIGS. 3B and 3D are diagrams explaining a second optical interface between the optical fiber 210 and the optical waveguide 240 according to exemplary embodiments of the present invention. The optical waveguide 240 includes the oxide layer 220 and the silicon layer 230. The silicon layer 230 includes the light receiving portion 250, to which light is input through the optical fiber 210. The light receiving portion 250 is shaped in a ribbed pattern. The incident light is input to the silicon layer 230 by adjusting the gap between ribs and the depth of ribs. The light input to the silicon layer 230 travels with total reflection since the silicon layer 230 has a higher refractive index than the oxide layer 220. The silicon layer 230 corresponds to a core layer and the oxide layer 220 corresponds to a cladding layer. Although not shown in FIG. 3B, the top of the silicon layer 230 may be covered with a cladding layer (e.g., an oxide layer).

Referring to FIG. 3B, the second light interface positions the optical fiber 210 to be vertical to the optical waveguide 240 to dictate a direction in which an optical signal travels in the optical waveguide 240. For example, when the optical fiber 210 is positioned to be vertical to the optical waveguide 240 so that incident light $P_{CW\_in}$ is input to the optical waveguide 240 in a third direction D3, the light $P_{CW\_in}$ travels in fourth and fifth directions D4 and D5 in the optical waveguide 240. The light $P_{CW\_in}$ may be split into the two directions D4 and D5 with equivalent proportions, e.g., a ratio of 1 to 1 (50% of the light traveling in the D4 direction and 50% of the light traveling in the D5 direction), but the present invention is not restricted to the current embodiments. For example, a ratio of light traveling in the fourth direction D4 to light traveling in the fifth direction D5 may be intentionally selected or unintentionally selected (for example, due to variables or errors in designing and manufacturing stages) to be other than 1 to 1.

As described above, since an incident light signal travels in dual directions when the second light interface is used, as illustrated in FIG. 3D optical waveguides 280a and 280b may also be formed in dual directions. The taper 270a may be provided between the light receiving portion 250 and the optical waveguide 280a to connect them and a taper 270b may be provided between the light receiving portion 250 and the optical waveguide 280b to connect them. The second light interface having the structure illustrated in FIGS. 3B and 3D is referred to as a vertical grating coupler.

The optical fiber 210 is illustrated as means for inputting light to the optical waveguide 240 in FIGS. 3A through 3D, but the present invention is not restricted to the embodiments illustrated in FIGS. 3A through 3D. The means for inputting light to the optical waveguide 240 may be implemented by a waveguide or a different element known in the art.

The optical interfaces illustrated in FIGS. 3A through 3D may be used not only to input light to the optical waveguide 240 but to output light from the optical waveguide 240. The optical interfaces illustrated in FIGS. 3A through 3D may be used not only as light input unit for inputting optical signals to optical modulators 200, 200', 200", 300, 300', 300", 600, and 600' according to exemplary embodiments of the present invention but also as light output units for outputting optical signals from the optical modulators 200, 200', 200", 300, 300', 300", 600, and 600'.

Figure 4A:
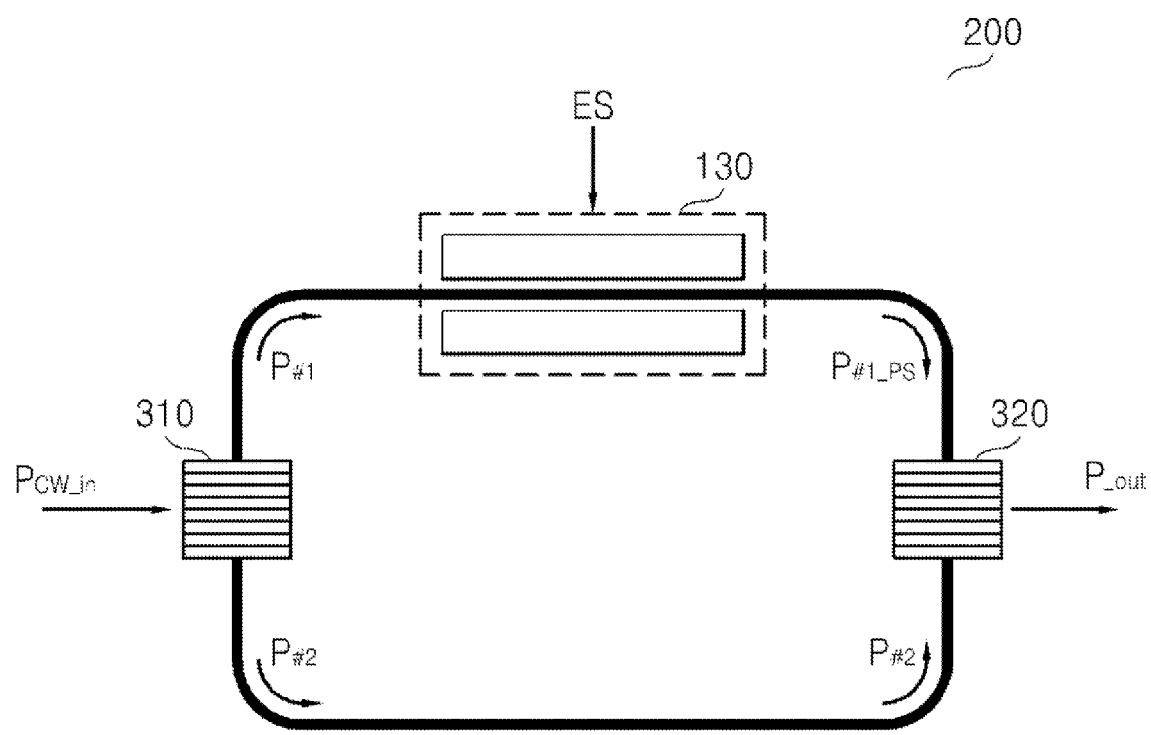
FIG. 4A is a diagram of an optical modulator according to exemplary embodiments of the present invention.

FIG. 4A is a diagram of the optical modulator 200 according to exemplary embodiments of the present invention. Referring to FIG. 4A, the optical modulator 200 includes a first vertical grating coupler 310, the phase shifter 130, and a second vertical grating coupler 320.

The first and second vertical grating couplers 310 and 320 may be implemented in the form of the second light interface illustrated in FIG. 3B. The first vertical grating coupler 310 may receive an optical signal $P_{CW\_in}$ from a light source in a vertical direction with respect to a plane along which the optical signal $P_{CW\_in}$ will be output to an optical waveguide (e.g., in a vertical direction with respect to the optical waveguide) and split the optical signal $P_{CW\_in}$ into two directions $P_{\#1}$ and $P_{\#2}$ at a predetermined ratio (e.g., a ratio of about 1 to 1 or other ratios). Moreover, the optical signal $P_{CW\_in}$ may be split into the two directions $P_{\#1}$ and $P_{\#2}$ at the ratio of 1 to 1. However, the present invention is not restricted to the current embodiments, and a ratio at which the optical signal $P_{CW\_in}$ is split into the two directions $P_{\#1}$ and $P_{\#2}$ may be intentionally set otherwise. An additional element may be provided to set the ratio to a particular value. Moreover, the ratio by which light is split in the two directions may be inadvertently affected by various variables and errors that may occur during actual implementation.

The phase shifter 130 modulates the phase of a signal (hereinafter, referred to as a first optical signal) transmitted from the first vertical grating coupler 310 along one of the two directions $P_{\#1}$ and $P_{\#2}$ according to an electrical signal and outputs a phase-modulated signal.

For example, the phase shifter 130 shifts the phase of the first optical signal traveling in the first direction $P_{\#1}$ in response to an electrical signal received from an optical modulator driver and outputs a phase-modulated signal $P_{\#1\_PS}$. When the electrical signal is "1", for example, when a predetermined supply voltage is applied to the phase shifter 130, the phase-modulated signal $P_{\#1\_PS}$ may have a predetermined phase difference (e.g., 90 or 180 degrees) from the first optical signal. When the electrical signal is "0", for example, when no supply voltage is applied to the phase shifter 130, the phase-modulated signal $P_{\#1\_PS}$ may have the same phase as the first optical signal.

As described above, the supply voltage is selectively applied to the phase shifter 130 according to data to be transmitted and the phase shifter 130 selectively delays the phase of the first optical signal by a predetermined angle (e.g., 180 degrees).

The second vertical grating coupler 320 receives and combines (or overlaps) the phase-modulated signal $P_{\#1\_PS}$ and a signal (hereinafter, referred to as a second optical signal) which has traveled in the second direction $P_{\#2}$ from the first vertical grating coupler 310 and outputs a combined signal in a vertical direction with respect to a plane along which the phase-modulated signal $P_{\#1\_PS}$ and the second optical signal have been received from the optical waveguide (e.g., in a vertical direction with respect to the optical waveguide).

Accordingly, a waveguide through which the phase-modulated signal $P_{\#1\_PS}$ travels may be coupled in a straight line (e.g., with an angle of 180 degrees) with a waveguide through which the second optical signal travels. The phase-modulated signal $P_{\#1\_PS}$ and the second optical signal are overlapped with each other and an output signal $P_{\_out}$ is output in a vertical direction with respect to the plane along which an optical signal has just travelled in the optical waveguide (e.g., in a vertical direction with respect to the optical waveguide).

The second vertical grating coupler 320 may overlap the phase-modulated signal $P_{\#1\_PS}$ with the second optical signal and the two signals may destructively or constructively interfere.

Figure 4B:
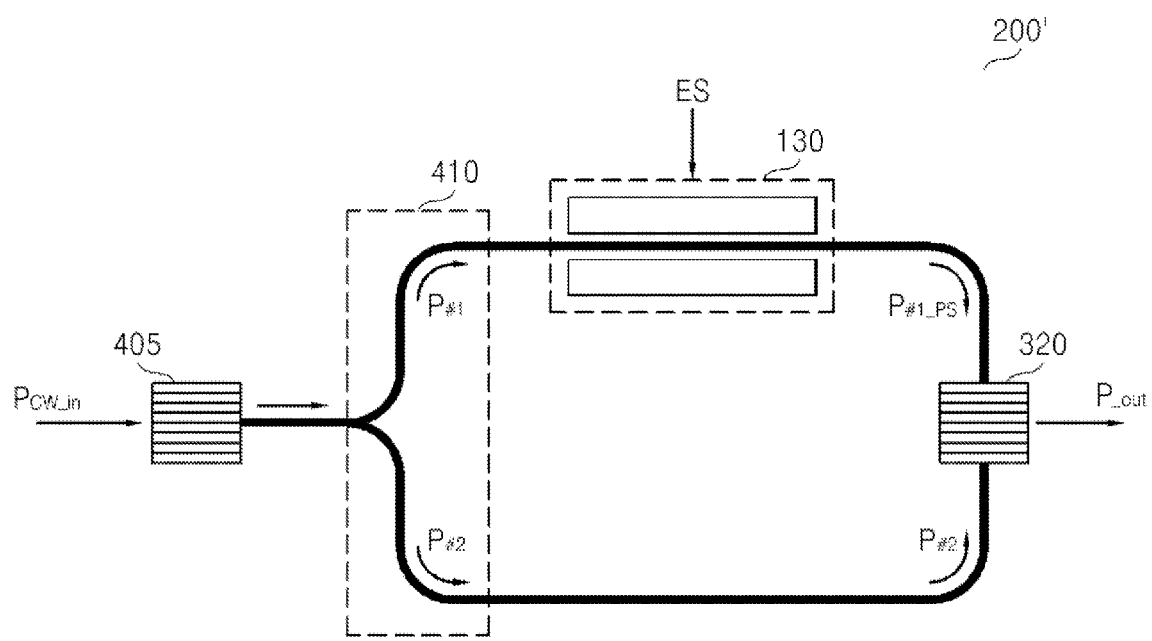
FIGS. 4B through 4F are diagrams of modifications of the optical modulator illustrated in FIG. 4A.

FIG. 4B is a diagram of a modification of the optical modulator 200 illustrated in FIG. 4A. Referring to FIG. 4B, an optical modulator 200' includes a first slanted grating coupler 405, a first Y-splitter 410, the phase shifter 130, and the second vertical grating coupler 320.

As compared to the optical modulator 200 illustrated in FIG. 4A, the optical modulator 200' illustrated in FIG. 4B includes the first slanted grating coupler 405 and the first Y-splitter 410 instead of the first vertical grating coupler 310.

The first slanted grating coupler 405 may be implemented in the form of the first optical interface illustrated in FIG. 3A.

The first Y-splitter 410 may be a passive element that splits light input through the input terminal 110. For example, the first Y-splitter 410 may split an incident optical signal $P_{CW\_in}$ at a predetermined ratio (e.g., a ratio of 1 to 1 or other ratios). The splitting angle of the first Y-splitter 410 may be random.

The phase shifter 130 may modulate the phase of a signal (e.g., a first optical signal) transmitted in one of the two directions in response to an electrical signal and output a phase-modulated signal.

For example, the phase shifter 130 shifts the phase of the first optical signal traveling in the first direction $P_{\#1}$ in response to an electrical signal received from an optical modulator driver and outputs a phase-modulated signal $P_{\#1\_PS}$.

The second vertical grating coupler 320 receives and overlaps the phase-modulated signal $P_{\#1\_PS}$ and a signal (e.g., a second optical signal) which has traveled in the second direction $P_{\#2}$ and outputs an overlapped signal in a vertical direction with respect to a plane along which the phase-modulated signal $P_{\#1\_PS}$ and the second optical signal have received from the optical waveguide (e.g., in a vertical direction with respect to the optical waveguide).

Accordingly, a waveguide through which the phase-modulated signal $P_{\#1\_PS}$ travels may be coupled with a waveguide through which the second optical signal travels in a straight line (e.g., with an angle of 180 degrees). The phase-modulated signal $P_{\#1\_PS}$ and the second optical signal are overlapped with each other in the second vertical grating coupler 320 and an output signal $P_{\_out}$ is output in a vertical direction with respect to the plane along which an optical signal has just travelled in the optical waveguide (e.g., in a vertical direction with respect to the optical waveguide).

The second vertical grating coupler 320 may overlap the phase-modulated signal $P_{\#1\_PS}$ with the second optical signal so that they destructively or constructively interfere.

Figure 4C:
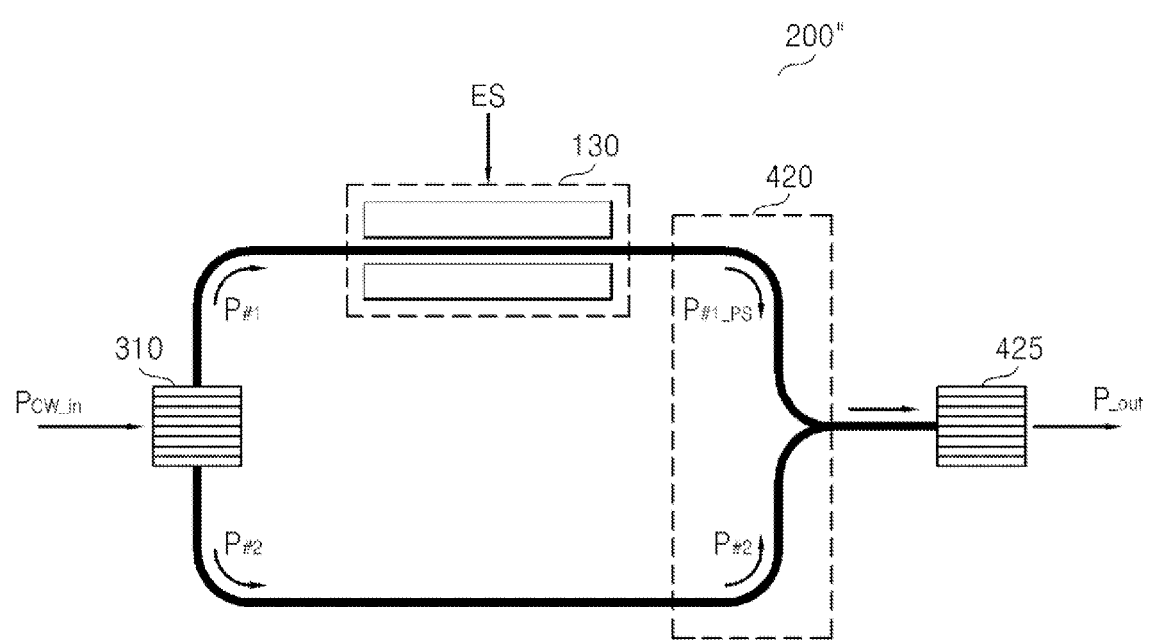

FIG. 4C is a diagram of a modification of the optical modulator 200 illustrated in FIG. 4A. Referring to FIG. 4C, an optical modulator 200" includes the first vertical grating coupler 310, the phase shifter 130, a Y-coupler 420, and a second slanted grating coupler 425.

As compared to the optical modulator 200 illustrated in FIG. 4A, the optical modulator 200" illustrated in FIG. 4C includes the Y-coupler 420 and the second slanted grating coupler 425 instead of the second vertical grating coupler 320.

The Y-coupler 420 is similar to the first Y-splitter 410 and is a passive element that couples light received in two directions. The Y-coupler 420 and the Y-splitter 410 may be substantially similar to each other and both the Y-coupler 429 and the Y-splitter 410 may be referred to as Y-splitters.

The second slanted grating coupler 425 may be implemented in the form of the first optical interface illustrated in FIG. 3A.

Figure 4D:
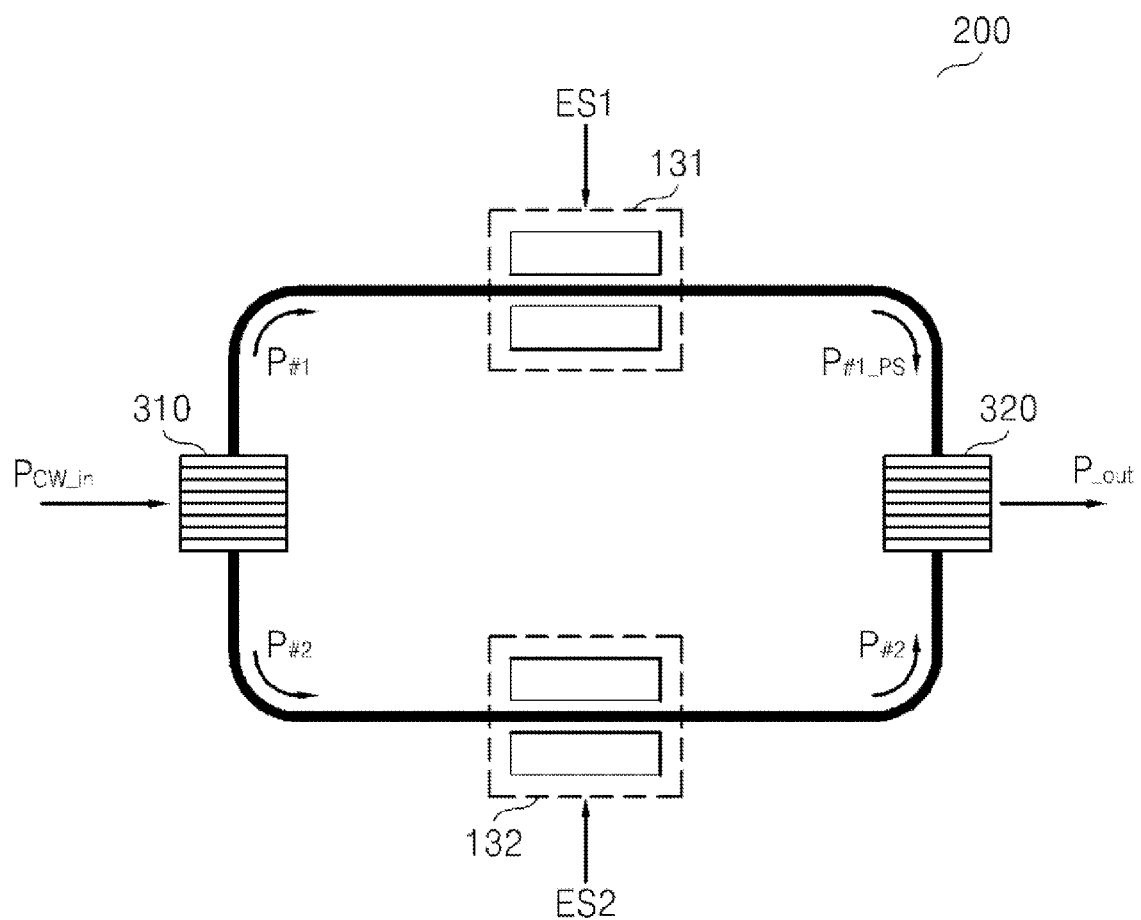

FIG. 4D is a diagram of a modification of the optical modulator 200 illustrated in FIG. 4A. An optical modulator 200 illustrated in FIG. 4D includes the first vertical grating coupler 310, a first phase shifter 131, a second phase shifter 132, and the second vertical grating coupler 320.

As compared to the optical modulator 200 illustrated in FIG. 4A, the optical modulator 200 illustrated in FIG. 4D includes the first and second phase shifters 131 and 132 instead of the single phase shifter 130.

The first phase shifter 131 may modulate the phase of a first optical signal transmitted from the first vertical grating coupler 310 according to a first electrical signal ES1 and output a phase-modulated signal. The second phase shifter 132 may modulate the phase of a second optical signal transmitted from the first vertical grating coupler 310 according to a second electrical signal ES2 and output a phase-modulated signal. The first phase shifter 131 may shift the phase of the first optical signal by a first angle (e.g., 90 degrees) and the second phase shifter 132 may shift the phase of the second optical signal by a second angle (e.g., −90 degrees). The first and second electrical signals ES1 and ES2 may be the same as or different from each other. For example, the second electrical signal ES2 may be generated by inverting the first electrical signal ES1, but the present invention is not restricted to this example.

Since the optical modulator 200 illustrated in FIG. 4D includes the phase shifters 131 and 132 in two paths, respectively, through which the first and second optical signals are respectively transmitted, the optical modulator 200 illustrated in FIG. 4D may have higher modulation efficiency than the optical modulator 200 illustrated in FIG. 4A which includes the single phase shifter 130 in only one of the two paths. Accordingly, each of the phase shifters 131 and 132 illustrated in FIG. 4D may be implemented in smaller size (e.g., may be shorter) than the phase shifter 130 illustrated in FIG. 4A.

Figure 4E:
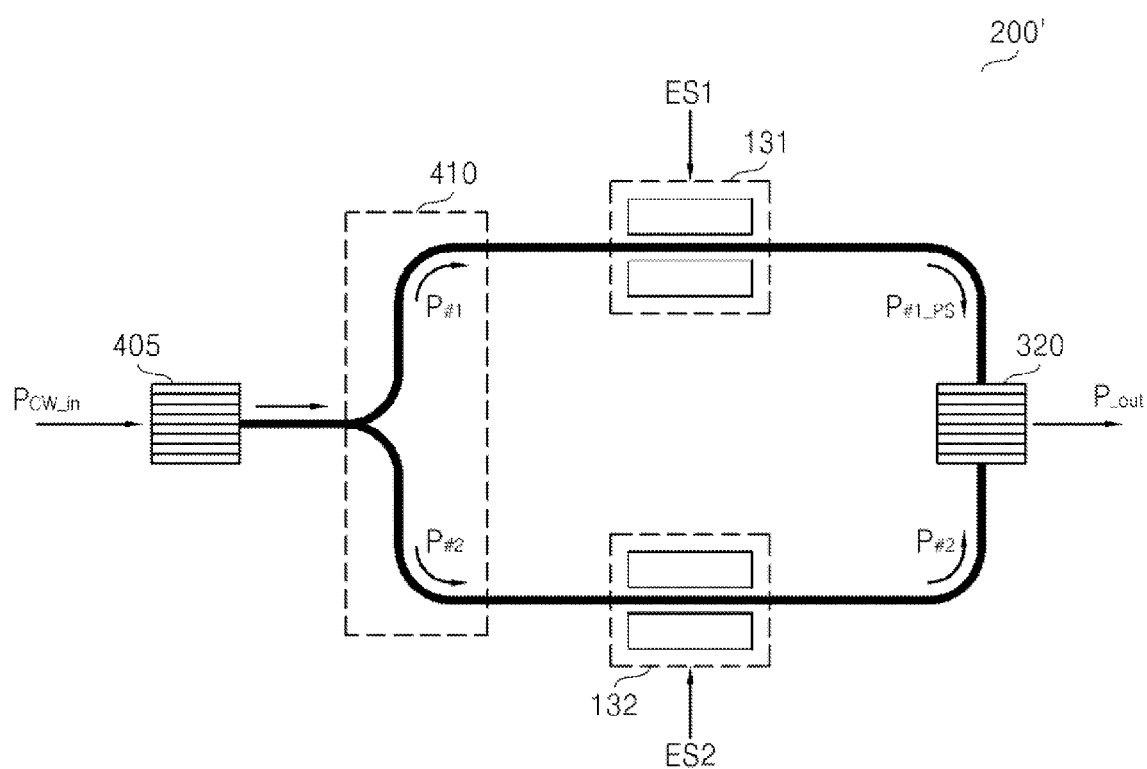

FIG. 4E is a diagram of a modification of the optical modulator 200' illustrated in FIG. 4B. As compared to the optical modulator 200' illustrated in FIG. 4B, an optical modulator 200' illustrated in FIG. 4E includes the first and second phase shifters 131 and 132 instead of the single phase shifter 130.

Figure 4F:
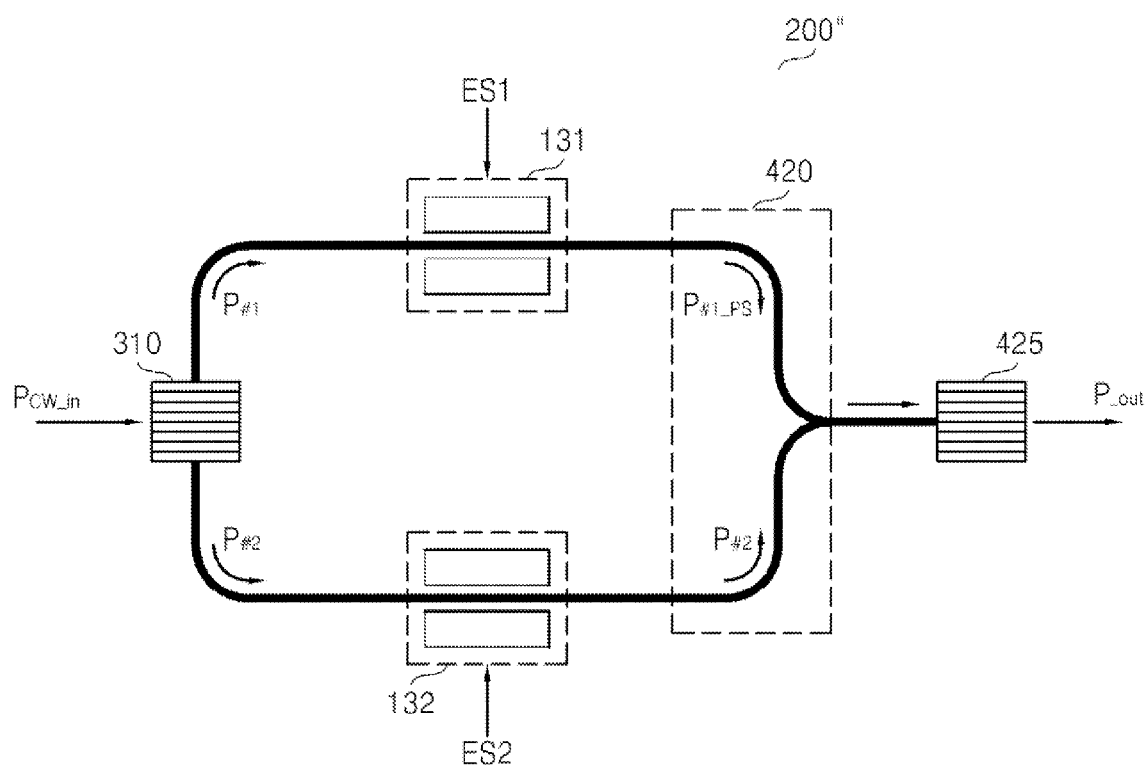

Similarly, FIG. 4F is a diagram of a modification of the optical modulator 200" illustrated in FIG. 4C. As compared to the optical modulator 200" illustrated in FIG. 4C, an optical modulator 200" illustrated in FIG. 4F includes the first and second phase shifters 131 and 132 instead of the single phase shifter 130.

A case where the first and second phase shifters 131 and 132 are provided instead of the single phase shifter 130 has been described above with reference to FIG. 4D. Thus, a detailed description thereof will be omitted.

Figure 5A:
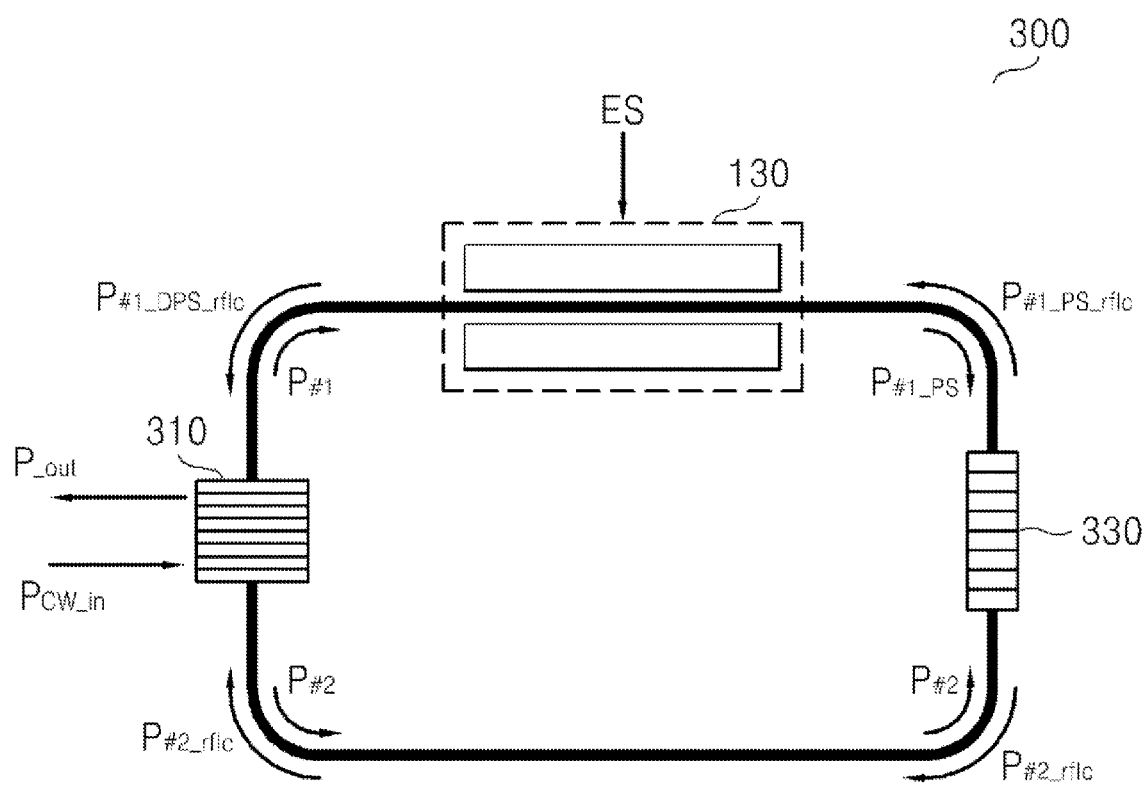
FIG. 5A is a diagram of an optical modulator according to exemplary embodiments of the present invention.

FIG. 5A is a diagram of an optical modulator 300 according to exemplary embodiments of the present invention. Referring to FIG. 5A, the optical modulator 300 may correspond to the optical modulator 200 illustrated in FIG. 1 and may include the first vertical grating coupler 310, the phase shifter 130, and a first reflective grating coupler 330.

The first vertical grating coupler 310 may be implemented in the form of the second light interface illustrated in FIG. 3B. The first vertical grating coupler 310 receives an optical signal $P_{CW\_in}$ from a light source in a vertical direction with respect to a plane along which the optical signal $P_{CW\_in}$ will be output to an optical waveguide (e.g., in a vertical direction with respect to the optical waveguide) and transmits the optical signal $P_{CW\_in}$ in two directions $P_{\#1}$ and $P_{\#2}$ at a predetermined ratio (e.g., a ratio of about 1 to 1 or other ratios).

The phase shifter 130 modulates the phase of a signal (e.g., a first optical signal) transmitted in one of the two directions $P_{\#1}$ and $P_{\#2}$ from the first vertical grating coupler 310 and outputs a phase-modulated signal.

For example, the phase shifter 130 shifts the phase of the first optical signal traveling in the first direction $P_{\#1}$ in response to an electrical signal received from an optical modulator driver and outputs a first phase-modulated signal $P_{\#1\_PS}$.

The first reflective grating coupler 330 reflects an optical signal (e.g., a second optical signal) traveling in the second direction $P_{\#2}$ back along the same path the second optical signal travels through and reflects the first phase-modulated signal $P_{\#1\_PS}$ back along the same path the first phase-modulated signal $P_{\#1\_PS}$ travels through.

The phase shifter 130 receives a reflected first phase-modulated signal $P_{\#1\_PS\_rflc}$, modulates the phase thereof, and outputs a second phase-modulated signal $P_{\#1\_DPS\_rflc}$.

As described above, the phase shifter 130 first modulates the phase of the first optical signal and then modulates the phase of a first phase-modulated signal reflected by the first reflective grating coupler 330, thereby increasing modulation efficiency. Accordingly, the phase shifter 130 illustrated in FIG. 5A can be implemented in smaller size (e.g., the phase shifter may be shorter) than the phase shifter 130 illustrated in FIGS. 4A through 4C.

A waveguide through which the second phase-modulated signal $P_{\#1\_DPS\_rflc}$ travels may be coupled in a straight line (e.g., with an angle of 180 degrees) with a waveguide through which a reflected optical signal $P_{\#2\_rflc}$ from the first reflective grating coupler 330 travels. The second phase-modulated signal $P_{\#1\_DPS\_rflc}$ and the reflected optical signal $P_{\#2\_rflc}$ are overlapped with each other in the first vertical grating coupler 310 and an output signal $P_{\_out}$ is output in a vertical direction with respect to the plane along which an optical signal has just travelled in an optical waveguide (e.g., in a vertical direction with respect to the optical waveguide).

The first vertical grating coupler 310 may overlap the second phase-modulated signal $P_{\#1\_DPS\_rflc}$ with the reflected optical signal $P_{\#2\_rflc}$ so that they destructively or constructively interfere.

Figure 5B:
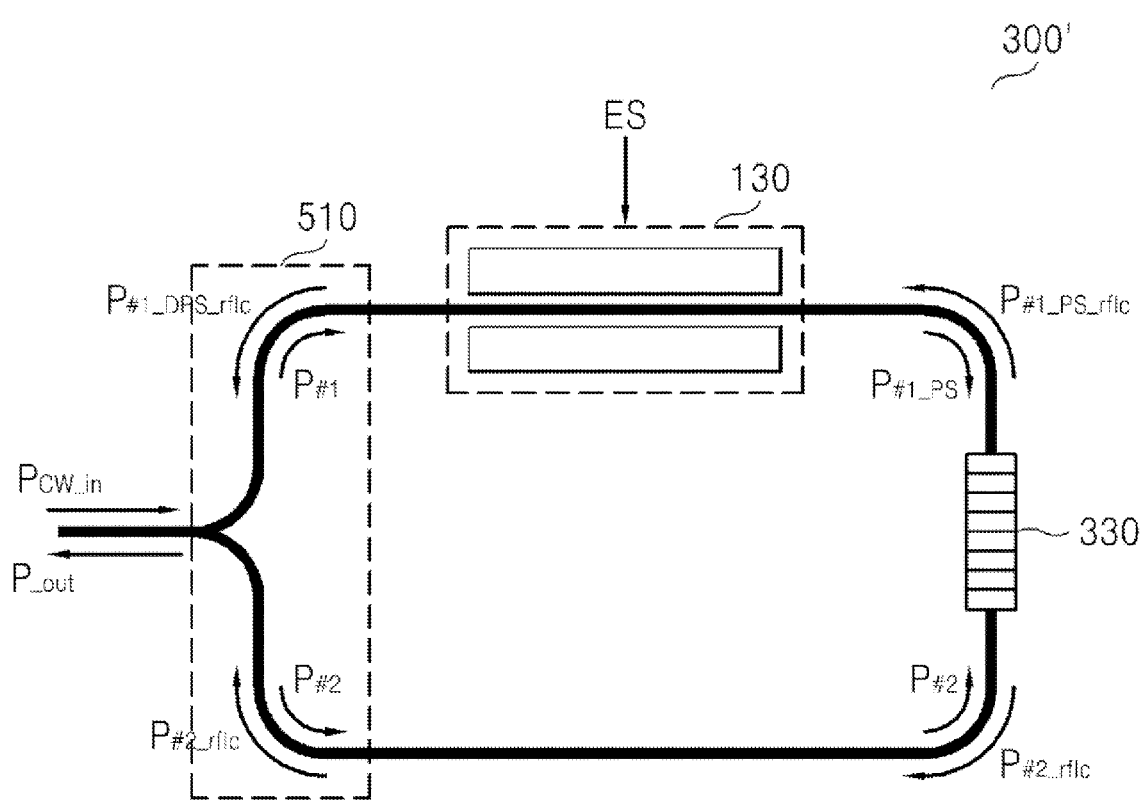
FIGS. 5B through 5F are diagrams of modifications of the optical modulator illustrated in FIG. 5A.

FIG. 5B is a diagram of a modification of the optical modulator 300 illustrated in FIG. 5A. Referring to FIG. 5B, an optical modulator 300' includes a first Y-splitter 510, the phase shifter 130, and the second vertical grating coupler 320.

As compared to the optical modulator 300 illustrated in FIG. 5A, the optical modulator 300' illustrated in FIG. 5B includes the first Y-splitter 510 instead of the first vertical grating coupler 310.

Similar to the optical modulator 200' illustrated in FIG. 4B, the optical modulator 300' may also include a slanted grating coupler (not shown) before the first Y-splitter 510.

The first Y-splitter 510 is a passive element that splits light input through the input terminal 110. For example, the first Y-splitter 510 may split an incident optical signal $P_{CW\_in}$ at a predetermined ratio (e.g., a ratio of 1 to 1 or other ratios). The splitting angle of the first Y-splitter 510 may be random.

The phase shifter 130 modulates the phase of a signal (e.g., a first optical signal) transmitted in one of the two directions and outputs a phase-modulated signal.

For example, the phase shifter 130 shifts the phase of the first optical signal traveling in the first direction $P_{\#1}$ in response to an electrical signal received from an optical modulator driver and outputs a first phase-modulated signal $P_{\#1\_PS}$. The first phase-modulated signal $P_{\#1\_PS}$ may have a 180-degree phase difference from the phase of the first optical signal traveling in the first direction $P_{\#1}$.

The first reflective grating coupler 330 reflects an optical signal (e.g., a second optical signal) traveling in the second direction $P_{\#2}$ back along a path the second optical signal has traveled through and reflects the first phase-modulated signal $P_{\#1\_PS}$ back along a path the first phase-modulated signal $P_{\#1\_PS}$ has traveled through.

The phase shifter 130 receives a reflected first phase-modulated signal $P_{\#1\_PS\_rflc}$, modulates the phase thereof, and outputs a second phase-modulated signal $P_{\#1\_DPS\_rflc}$.

The second phase-modulated signal $P_{\#1\_DPS\_rflc}$ and a reflected optical signal $P_{\#2\_rflc}$ traveling from the first reflective grating coupler 330 back along the path the second optical signal comes are overlapped with each other in the first Y-splitter 510 and an output signal $P\_out$ may be output through the slanted grating coupler.

Figure 5C:
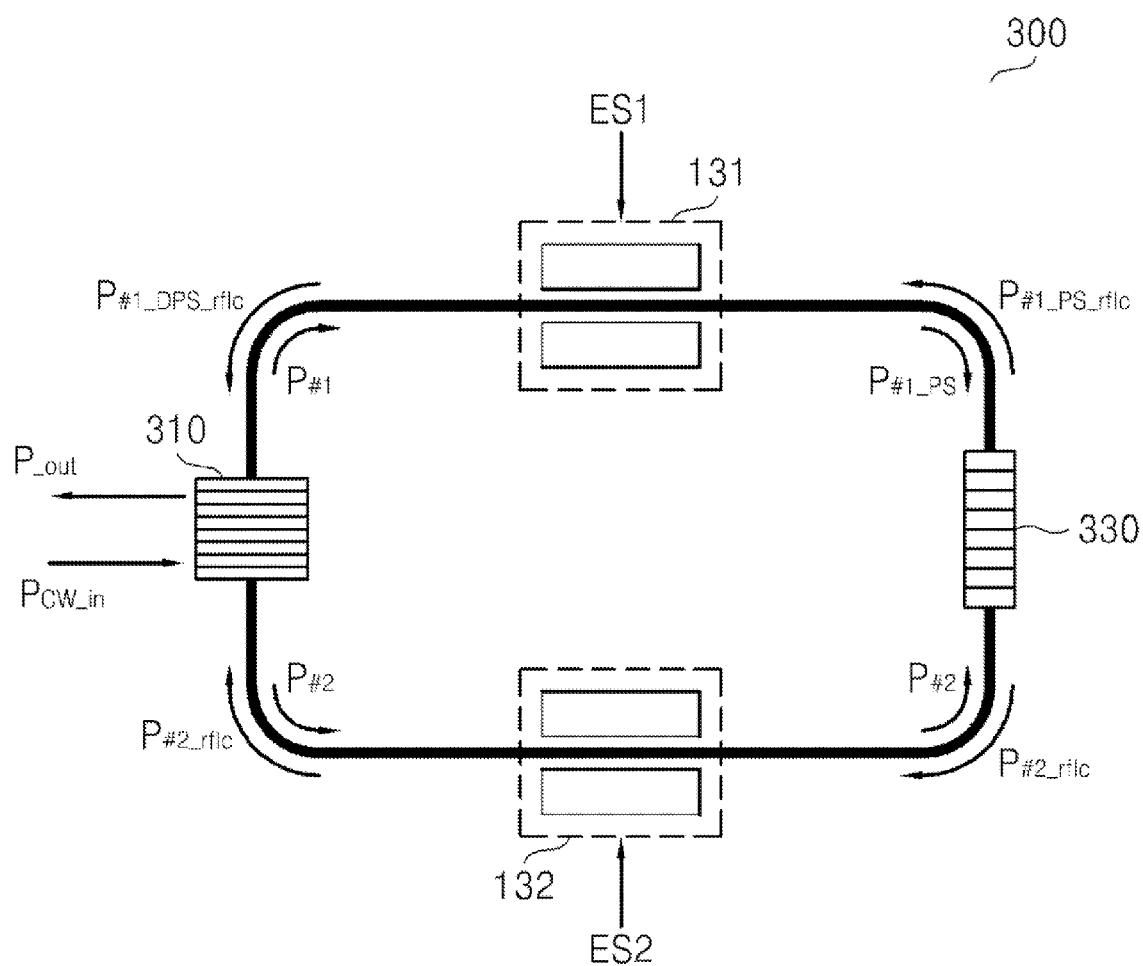

FIG. 5C is a diagram of a modification of the optical modulator 300 illustrated in FIG. 5A. As compared to the optical modulator 300 illustrated in FIG. 5A, an optical modulator 300 illustrated in FIG. 5C includes the first and second phase shifters 131 and 132 instead of the single phase shifter 130.

Figure 5D:
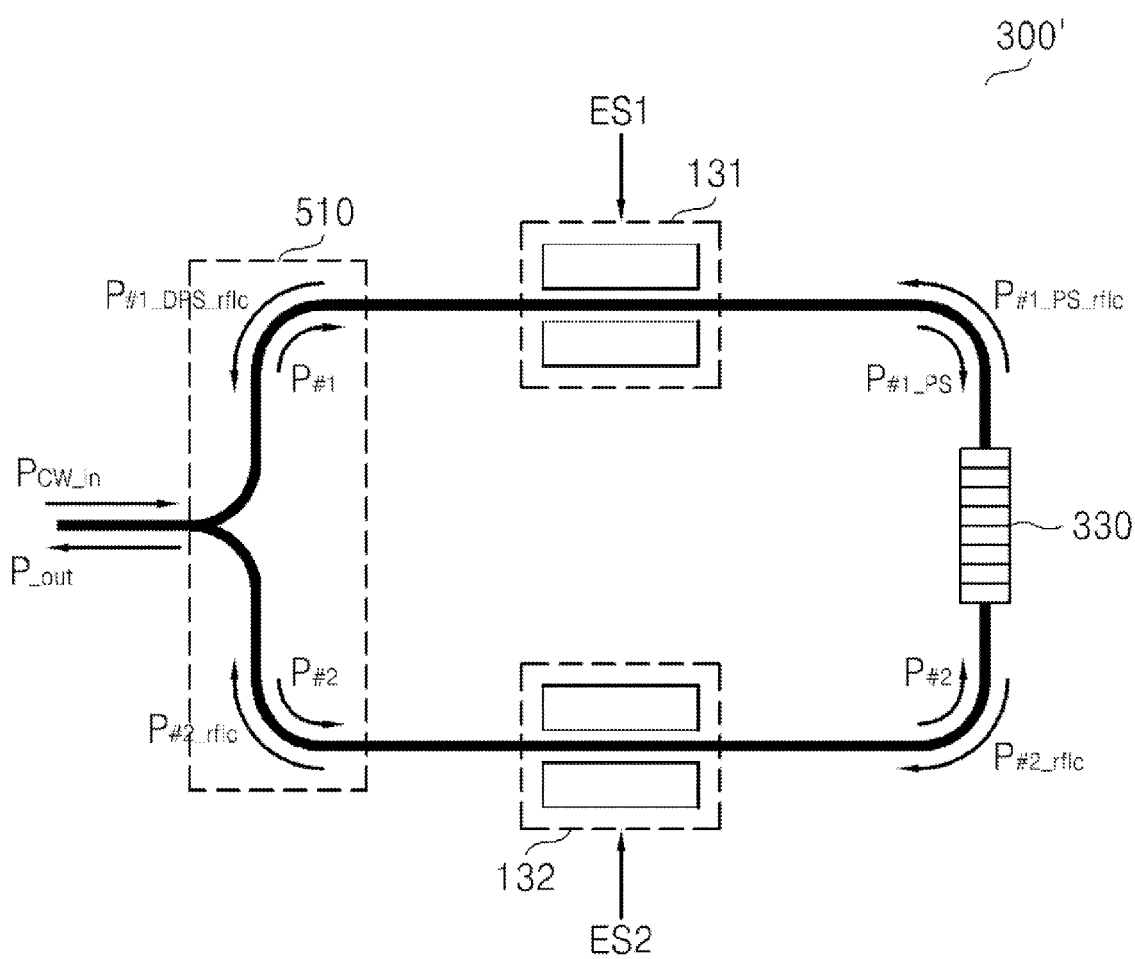

Similarly, FIG. 5D is a diagram of a modification of the optical modulator 300' illustrated in FIG. 5B. As compared to the optical modulator 300' illustrated in FIG. 5B, an optical modulator 300' illustrated in FIG. 5D includes the first and second phase shifters 131 and 132 instead of the single phase shifter 130.

Figure 5E:
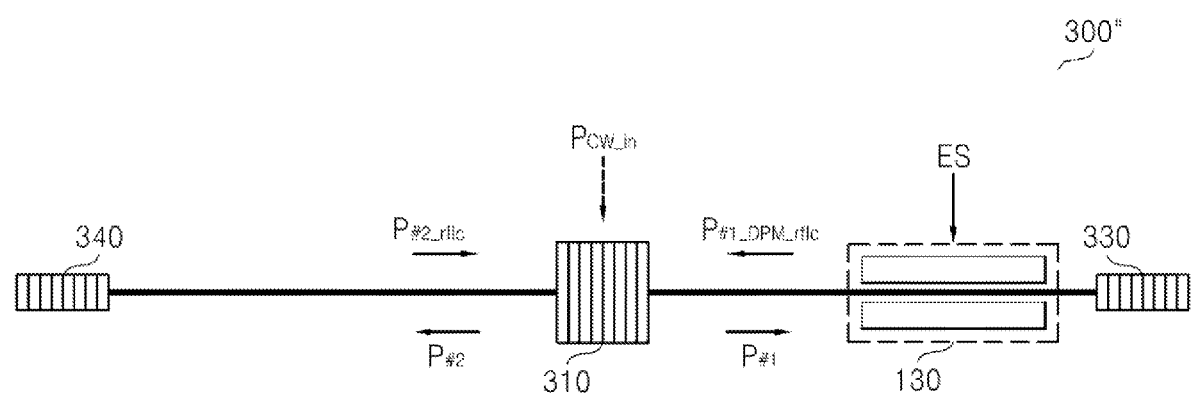

FIG. 5E is a diagram of a modification of the optical modulator 300 illustrated in FIG. 5A. Referring to FIG. 5E, an optical modulator 300" includes the first vertical grating coupler 310, the phase shifter 130, the first reflective grating coupler 330, and a second reflective grating coupler 340.

The optical modulator 300" illustrated in FIG. 5E performs the same operations as the optical modulator 300 illustrated in FIG. 5A, with the exception that the optical modulator 300" further includes the second reflective grating coupler 340. When the second reflective grating coupler 340 is further provided, space wasted between waveguides in two directions shown in FIG. 5A can be reduced.

The first vertical grating coupler 310 transmits an incident optical signal $P_{CW\_in}$ in a first direction $P_{\#1}$ and a second direction $P_{\#2}$ at a predetermined ratio (e.g., a ratio of 1 to 1 or other ratios) and overlaps a second phase-modulated signal $P_{\#1\_DPS\_rflc}$ reflected in an opposite direction with respect to the first direction $P_{\#1}$ with a reflected optical signal $P_{\#2\_rflc}$ traveling in an opposite direction with respect to the second direction $P_{\#2}$.

Figure 5F:
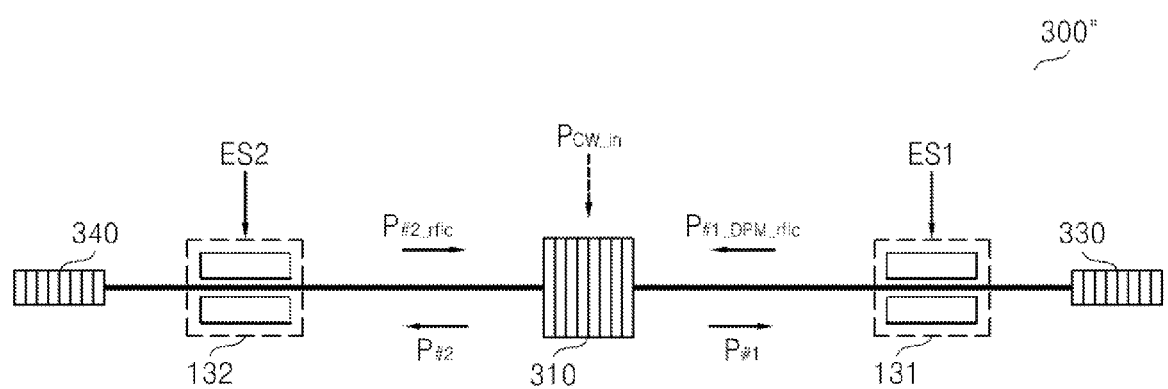

FIG. 5F is a diagram of a modification of the optical modulator 300" illustrated in FIG. 5E. As compared to the optical modulator 300" illustrated in FIG. 5E, an optical modulator 300" illustrated in FIG. 5F includes the first and second phase shifters 131 and 132 instead of the single phase shifter 130.

The elements (e.g., a vertical grating coupler, a reflective grating coupler, an optical waveguide, etc.) of the optical modulators 300" are disposed in a straight line in the modifications illustrated in FIGS. 5E and 5F, but the present invention is not restricted to these modifications. The elements of the optical modulator 300" do not need to be disposed in a straight line and may be disposed in spare space on a chip including the optical modulator 300" to reduce the size.

Figure 6A:
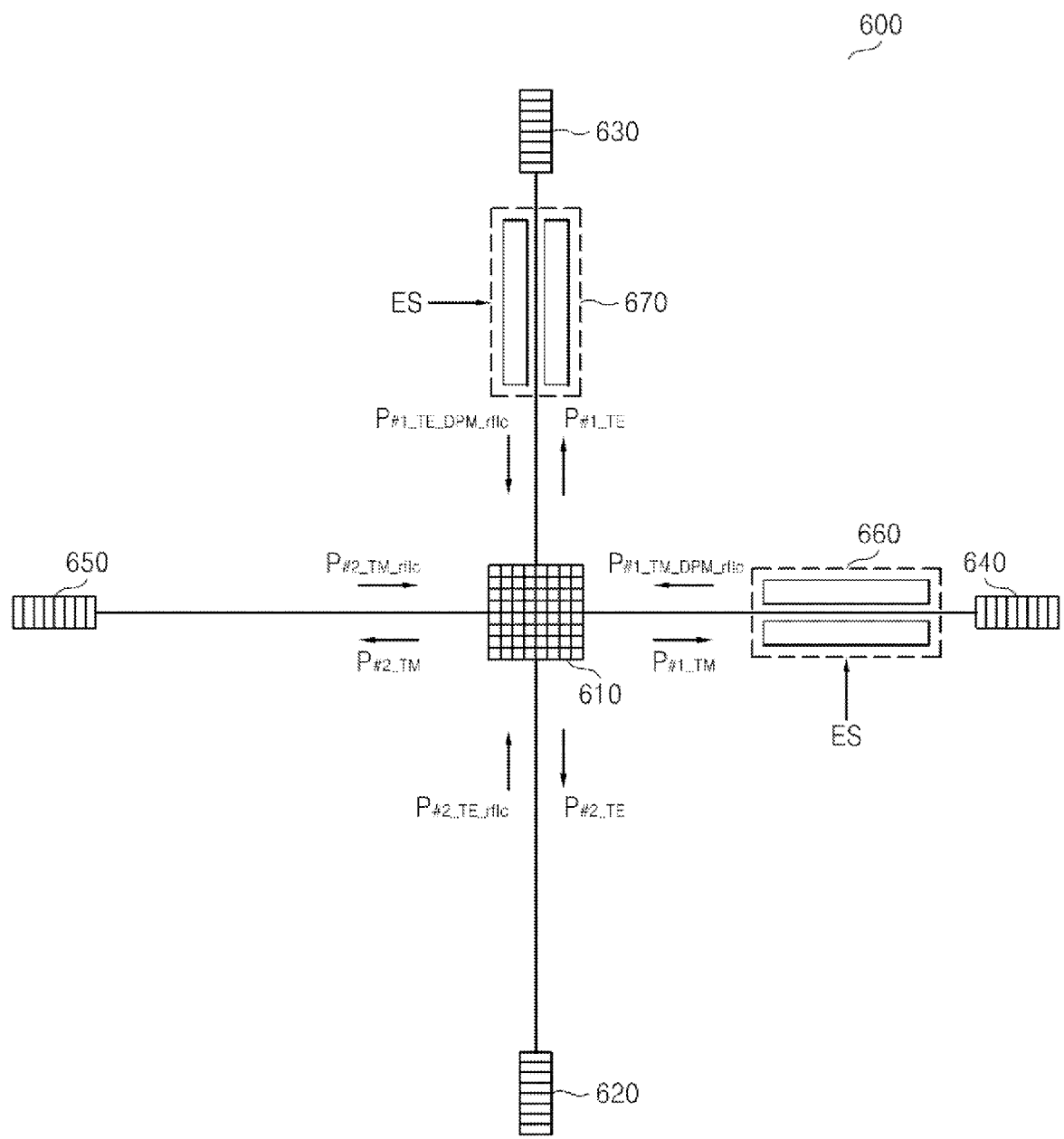
FIG. 6A is a diagram of an optical modulator according to exemplary embodiments of the present invention.

FIG. 6A is a diagram of an optical modulator 600 according to exemplary embodiments of the present invention. The optical modulator 600 illustrated in FIG. 6A may correspond to the optical modulator 200 illustrated in FIG. 1. The optical modulator 600 includes a vertical grating coupler 610, a first phase shifter 670, a second phase shifter 660, a first reflective grating coupler 630, a second reflective grating coupler 620, a third reflective grating coupler 640, and a fourth reflective grating coupler 650.

The optical modulator 600 separately modulates an incident optical signal according to two different types of polarization and may correspond to a form in which two optical modulators 300" illustrated in FIG. 5E are combined with each other.

The two types of polarization may be transverse electric (TE) polarization and transverse magnetic (TM) polarization. An incident optical signal may be transmitted along an optical waveguide in two directions with a predetermined ratio (e.g., a ratio of around 1 to 1 or other ratios) at each of TE polarization and TM polarization.

In case of TE polarization, an incident optical signal is split into a first direction and a second direction by the vertical grating coupler 610. An optical signal $P_{\#1\_TE}$ traveling in the first direction is reflected by the first reflective grating coupler 630 via the first phase shifter 670 so as to be output as a first reflected signal $P_{\#1\_TE\_DPM\_rflc}$. An optical signal $P_{\#2\_TE}$ traveling in the second direction is reflected by the second reflective grating coupler 620 so as to be output as a second reflected signal $P_{\#2\_TE\_rflc}$. The first and second directions may have an angle of 180 degrees therebetween.

In case of TM polarization, an incident optical signal is split into a third direction and a fourth direction by the vertical grating coupler 610. An optical signal $P_{\#1\_TM}$ traveling in the third direction is reflected by the third reflective grating coupler 640 via the second phase shifter 660 so as to be output as a third reflected signal $P_{\#1\_TM\_DPM\_rflc}$. An optical signal $P_{\#2\_TM}$ traveling in the fourth direction is reflected by the fourth reflective grating coupler 650 so as to be output as a fourth reflected signal $P_{\#2\_TM\_rflc}$.

The third and fourth directions may have an angle of 180 degrees therebetween. The first direction may be vertical to the third direction.

Figure 6B:
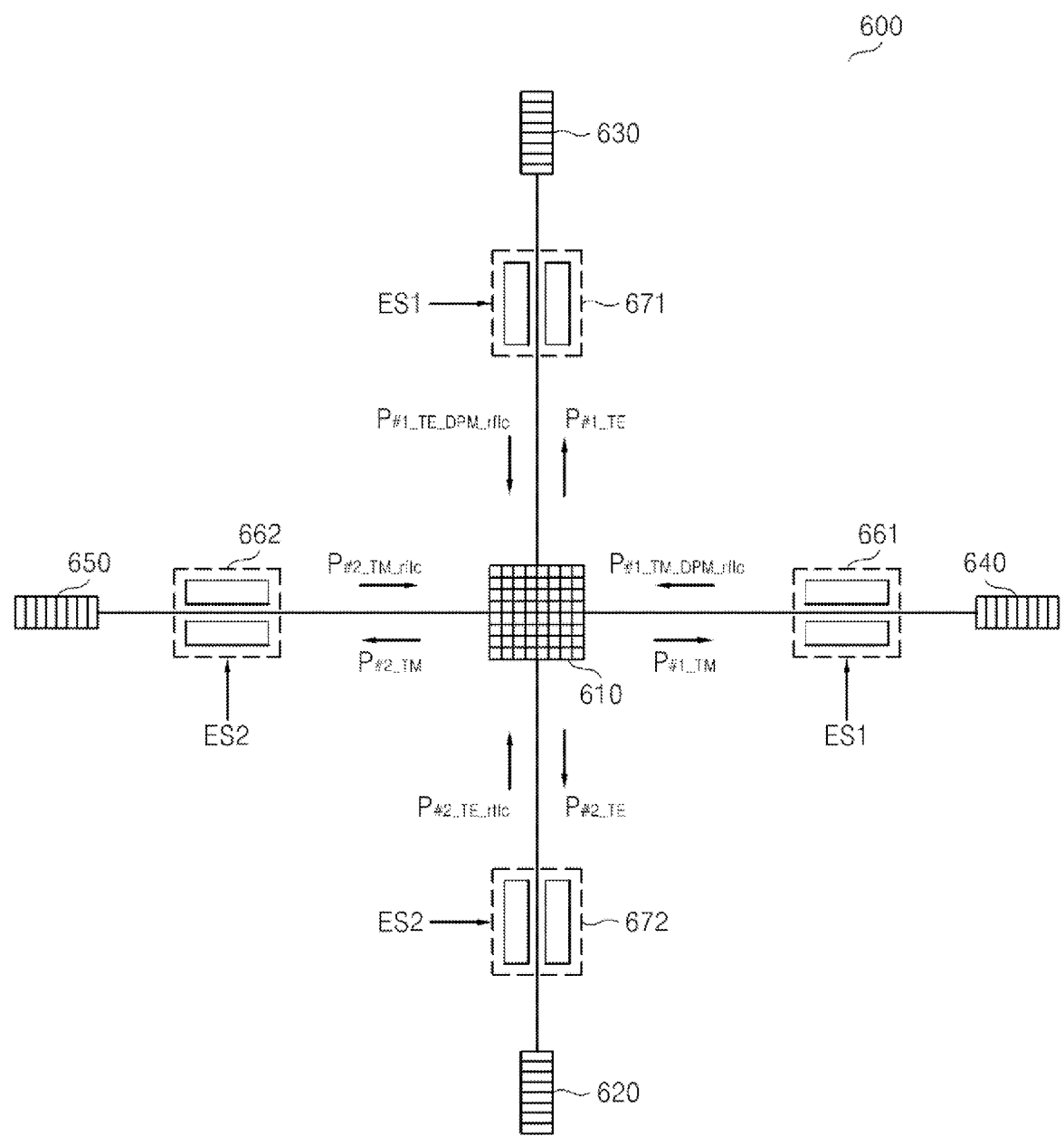
FIGS. 6B through 6D are diagrams of modifications of the optical modulator illustrated in FIG. 6A.

FIG. 6B is a diagram of a modification of the optical modulator 600 illustrated in FIG. 6A. As compared to the optical modulator 600 illustrated in FIG. 6A, an optical modulator 600 illustrated in FIG. 6B includes two phase shifters 661 and 662 instead of single phase shifter 660 for the TM polarization and includes tow phase shifters 671 and 672 instead of single phase shifter 670 for the TE polarization.

Accordingly, in case of TE polarization, an incident optical signal is split into the first direction and the second direction by the vertical grating coupler 610. The optical signals $P_{\#1\_TE}$ and $P_{\#2\_TE}$ are processed by the phase shifter 671 and 672, respectively, then reflected by the reflective grating couplers 630 and 620, respectively, and then processed again by the phase shifters 671 and 672, respectively.

In case of TM polarization, an incident optical signal is split into the third direction and the fourth direction by the vertical grating coupler 610. The optical signals $P_{\#1\_TM}$ and $P_{\#2\_TM}$ are processed by the phase shifter 661 and 662, respectively, then reflected by the reflective grating couplers 634 and 650, respectively, and then processed again by the phase shifters 661 and 662, respectively.

Figure 6C:
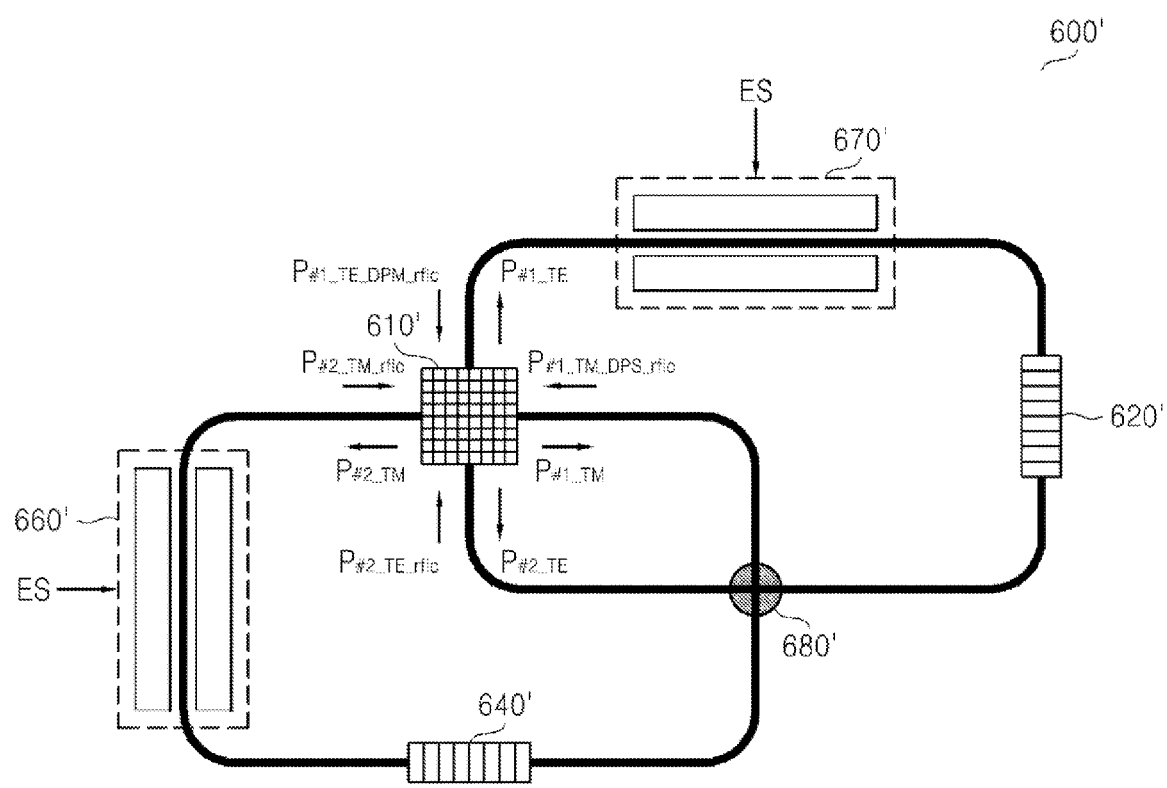

FIG. 6C is a diagram of a modification of the optical modulator 600 illustrated in FIG. 6A. An optical modulator 600' illustrated in FIG. 6C includes a vertical grating coupler 610', a first phase shifter 670', a second phase shifter 660', a first reflective grating coupler 620', and a second reflective grating coupler 640'.

The optical modulator 600' illustrated in FIG. 6C performs the same operations as the optical modulator 600 illustrated in FIG. 6A. However, the optical modulator 600' illustrated in FIG. 6C includes one less reflective grating couplers for each polarization type than the optical modulator 600 illustrated in FIG. 6A.

Whereas the optical modulator 600 illustrated in FIG. 6A has an open structure in which the vertical grating coupler 610, the first reflective grating coupler 630, and the second reflective grating coupler 620 are disposed in a line and the vertical grating coupler 610, the third reflective grating coupler 640, and the fourth reflective grating coupler 650 are disposed in another line, the optical modulator 600' illustrated in FIG. 6C has a double-loop structure in which the vertical grating coupler 610' and the first reflective grating coupler 620' are disposed to form one closed loop and the vertical grating coupler 610' and the second reflective grating coupler 640' are disposed to form another closed loop.

Since the optical modulator 600' includes one less reflective grating coupler for each polarization type in a waveguide than the optical modulator 600, the optical modulator 600' may also include a waveguide cross element 680' which both of two polarized signals, e.g., a TE polarized signal and a TM polarized signal pass.

Figure 6D:
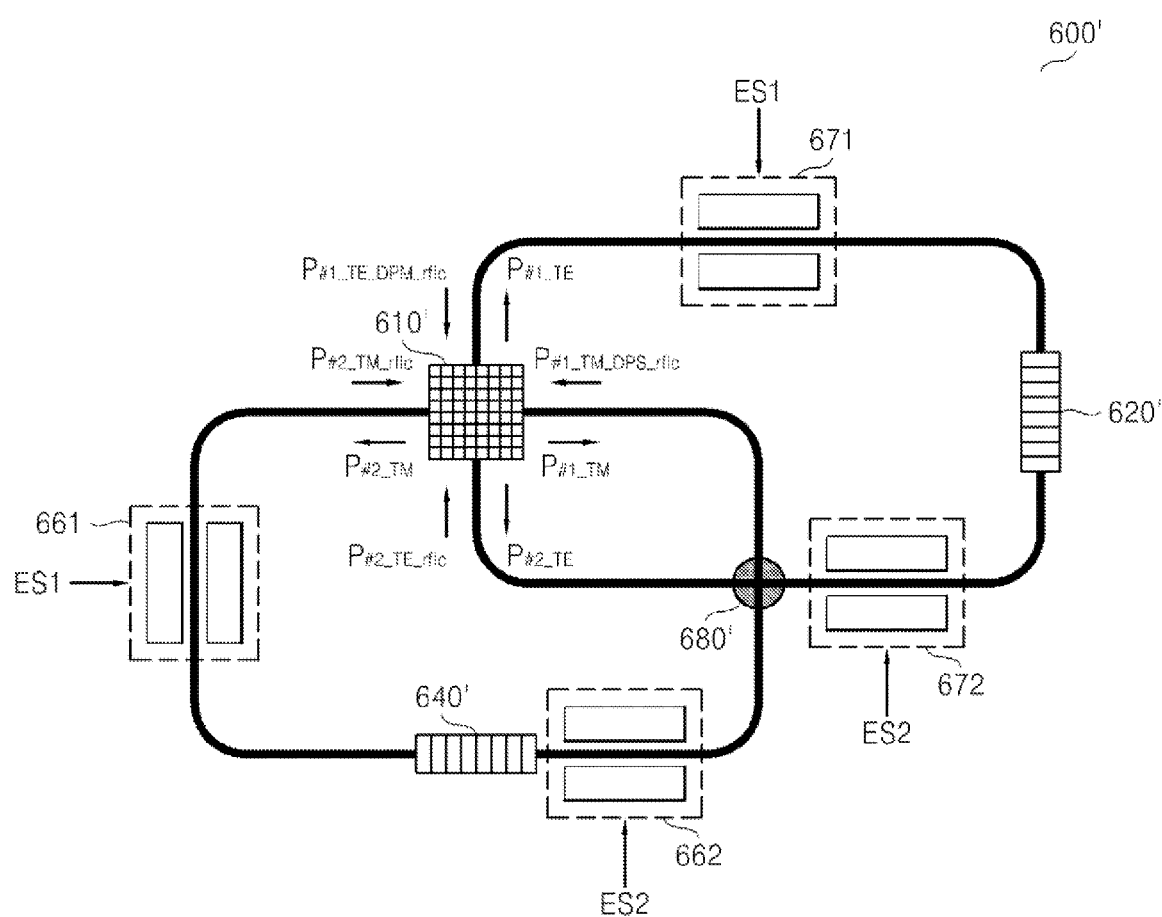

FIG. 6D is a diagram of a modification of the optical modulator 600' illustrated in FIG. 6C. As compared to the optical modulator 600' illustrated in FIG. 6C, an optical modulator 600' illustrated in FIG. 6D includes the two phase shifters 661 and 662 instead of the single phase shifter 660' for TM polarization and two phase shifters 671 and 672 instead of the single phase shifter 670' for TE polarization.

As described above, an optical modulator according to exemplary embodiments of the present invention includes a vertical or a reflective grating instead of at least one Y-splitter, so that the size of the optical modulator is reduced.

Figure 7A:
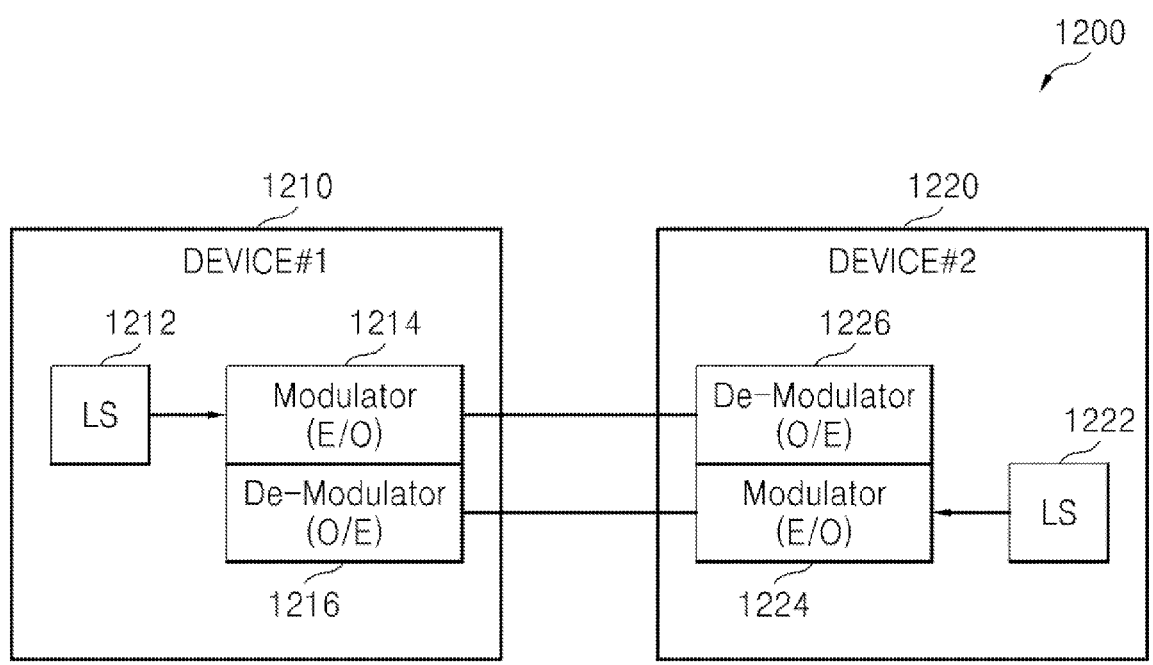
FIG. 7A is a block diagram of a data processing system including one of the optical modulators illustrated in FIGS. 4A through 6D according to exemplary embodiments of the present invention.

FIG. 7A is a block diagram of a data processing system 1200 including one of the optical modulators 200, 200', 200", 300, 300', 300", 600, and 600' illustrated in FIGS. 4A through 6D according to exemplary embodiments of the present invention.

Referring to FIG. 7A, the data processing system 1200 includes a first device 1210 and a second device 1220. The first device 1210 and the second device 1220 may communicate optical signals with each other using serial communication.

The first device 1210 includes a first light source 1212, a first optical modulator 1214 performing electrical-to-optical conversion, and a first optical demodulator 1216 performing optical-to-electrical conversion.

The first light source 1212 outputs an optical signal having a continuous waveform. The first optical modulator 1214 may be implemented by any one of the optical modulators 200, 200', 200", 300, 300', 300", 600, and 600' illustrated in FIGS. 4A through 6D.

The first optical demodulator 1216 receives and demodulates an optical signal output from a second optical modulator 1224 included in the second device 1220 and outputs a demodulated electrical signal. The second device 1220 includes a second light source 1222, the second optical modulator 1224, and a second optical demodulator 1226.

The second light source 1222 outputs an optical signal having a continuous waveform. The second optical modulator 1224 may be implemented by any one of the optical modulators 200, 200', 200", 300, 300', 300", 600, and 600' illustrated in FIGS. 4A through 6D.

The second optical demodulator 1226 receives and demodulates an optical signal output from the first optical modulator 1214 included in the first device 1210 and outputs a demodulated electrical signal.

Figure 7B:
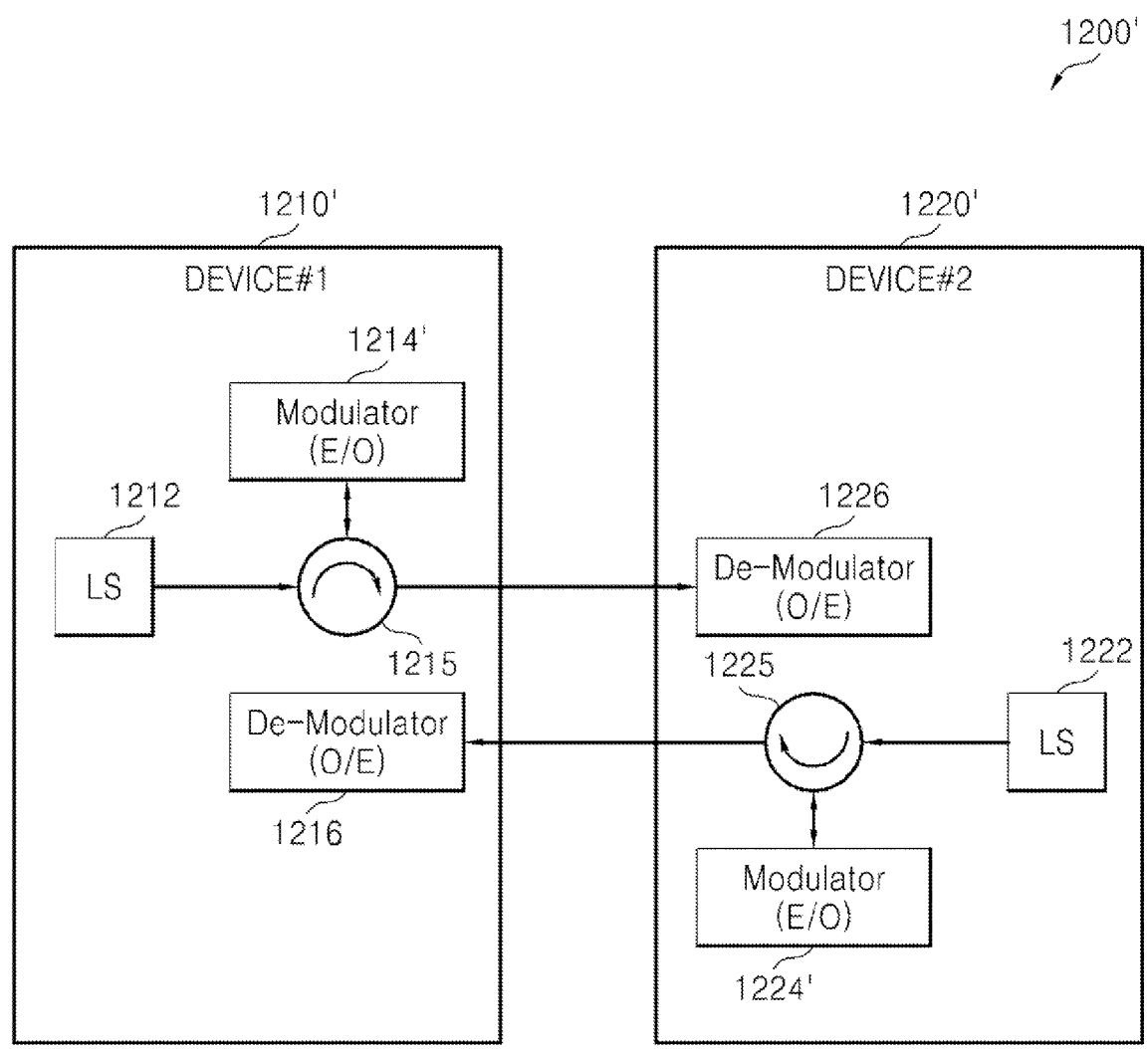
FIG. 7B is a block diagram of a data processing system including one of the optical modulators illustrated in FIGS. 4A through 6D according to exemplary embodiments of the present invention.

FIG. 7B is a block diagram of a data processing system 1200' including one of the optical modulators 200, 200', 200", 300, 300', 300", 600, and 600' illustrated in FIGS. 4A through 6D according to exemplary embodiments of the present invention. Referring to FIG. 7B, the data processing system 1200' includes a first device 1210' and a second device 1220'. The structure and the operations of the data processing system 1200' illustrated in FIG. 7B are similar to those of the data processing system 1200 illustrated in FIG. 7A. Thus, description will be focused on differences between the two data processing systems 1200 and 1200' to avoid redundancy. The first device 1210' further includes a first coupler 1215 as compared to the first device 1210. The second device 1220' further includes a second coupler 1225 as compared to the second device 1220.

Each of first and second optical modulators 1214' and 1224' may be one of optical modulators (e.g., 300, 300', 300", 600, and 600' illustrated in FIGS. 5A through 6D) in which the input and the output of an optical signal are performed through the same terminal or port among the optical modulators 200, 200', 200", 300, 300', 300", 600, and 600' illustrated in FIGS. 4A through 6D.

The first coupler 1215 transmits an optical signal output from the first light source 1212 to the first optical modulator 1214' and transmits a modulated optical signal output from the first optical modulator 1214' to the second device 1220'. Similarly, the second coupler 1225 transmits an optical signal output from the second light source 1222 to the second optical modulator 1224' and transmits a modulated optical signal output from the second optical modulator 1224' to the first device 1210'.

Figure 8:
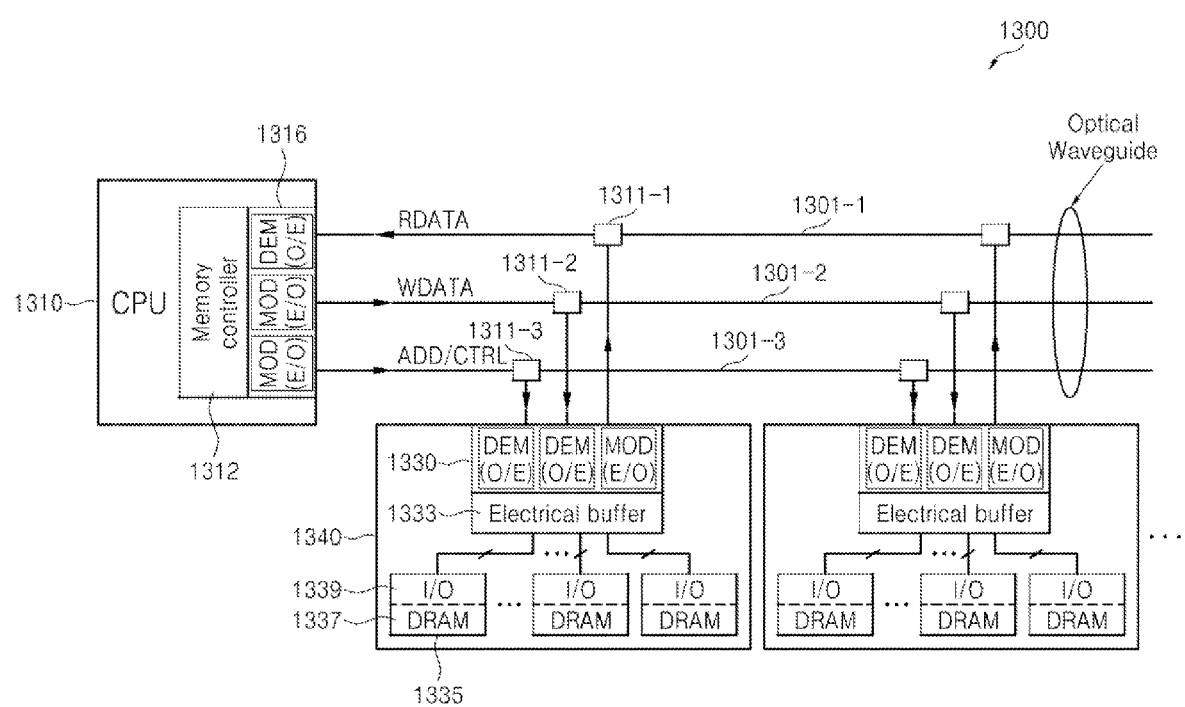
FIG. 8 is a block diagram of a data processing system including one of the optical modulators illustrated in FIGS. 4A through 6D according to exemplary embodiments of the present invention.

FIG. 8 is a block diagram of a data processing system including one of the optical modulators illustrated in FIGS. 4A through 6D according to exemplary embodiments of the present invention. In FIG. 8, MOD(E/O) denotes an optical modulator used as an E/O converter. The optical modulator MOD(E/O) may be implemented by one of the optical modulators 200, 200', 200", 300, 300', 300", 600, and 600' respectively illustrated in FIGS. 4A through 6D. Referring to FIG. 8, the data processing system 1300 includes a central processing unit (CPU) 1310, a plurality of data buses 1301-1, 1301-2, and 1301-3, and a plurality of memory modules 1340.

The memory modules 1340 transmit and receive optical signals through a plurality of couplers 1311-1, 1311-2, and 1311-3 respectively connected to the data buses 1301-1 through 1301-3. Each of the couplers 1311-1 through 1311-3 may be implemented by an electrical coupler or an optical coupler.

The CPU 1310 includes a first optical transceiver 1316, which includes at least one optical modulator MOD(E/O) and at least one optical demodulator DEM(O/E), and a memory controller 1312. The optical demodulator DEM(O/E) is used as an O/E converter. The memory controller 1312 is controlled by the CPU 1310 to control the operations, e.g., the transmitting operation and the receiving operation, of the first optical transceiver 1316.

For example, during a write operation, a first optical modulator MOD(E/O) of the first optical transceiver 1316 generates a modulated optical signal ADD/CTRL from addresses and control signals, as described above with reference to FIGS. 4A through 6D, and transmits the optical signal ADD/CTRL to the data bus 1301-3 in compliance with the memory controller 1312. After the first optical transceiver 1316 transmits the optical signal ADD/CTRL to the data bus 1301-3, a second optical modulator MOD(E/O) of the first optical transceiver 1316 generates modulated optical write data WDATA and transmits the optical write data WDATA to the data bus 1301-2.

Each of the memory modules 1340 includes a second optical transceiver 1330 and a plurality of memory devices 1335. Each memory module 340 may be implemented by an optical dual in-line memory module (DIMM), an optical fully buffered DIMM, an optical small outline dual in-line memory module (SO-DIMM), an optical registered DIMM (RDIMM), an optical load reduced DIMM (LRDIMM), an optical unbuffered DIMM (UDIMM), an optical micro DIMM, or an optical single in-line memory module (SIMM).

Referring to FIG. 8, an optical demodulator DEM(O/E) included in the second optical transceiver 1330 demodulates the optical write data WDATA received through the data bus 1301-2 and transmits a demodulated electrical signal to at least one of the memory devices 1335.

Each memory module 1340 may also include an electrical buffer 1333 which buffers an electrical signal output from an optical demodulator DEM(O/E). For example, the electrical buffer 1333 may buffer a demodulated electrical signal and transmits the buffered electrical signal to at least one of the memory devices 1335. Each of the memory devices 1335 includes a memory array 1337 including a plurality of memory cells, an access circuit 1339 accessing the memory array 1337, and a control logic (not shown) controlling the operation of the access circuit 1339.

During a read operation, an electrical signal output from a memory device 1335 is modulated into optical read data RDATA by an optical modulator MOD(E/O) included in the second optical transceiver 1330. The optical read data RDATA is transmitted to a first optical demodulator DEM(O/E) included in the CPU 1310 through the data bus 1301-1. The first optical demodulator DEM(O/E) demodulates the optical read data RDATA and transmits a demodulated electrical signal to the memory controller 1312.

Figure 9:
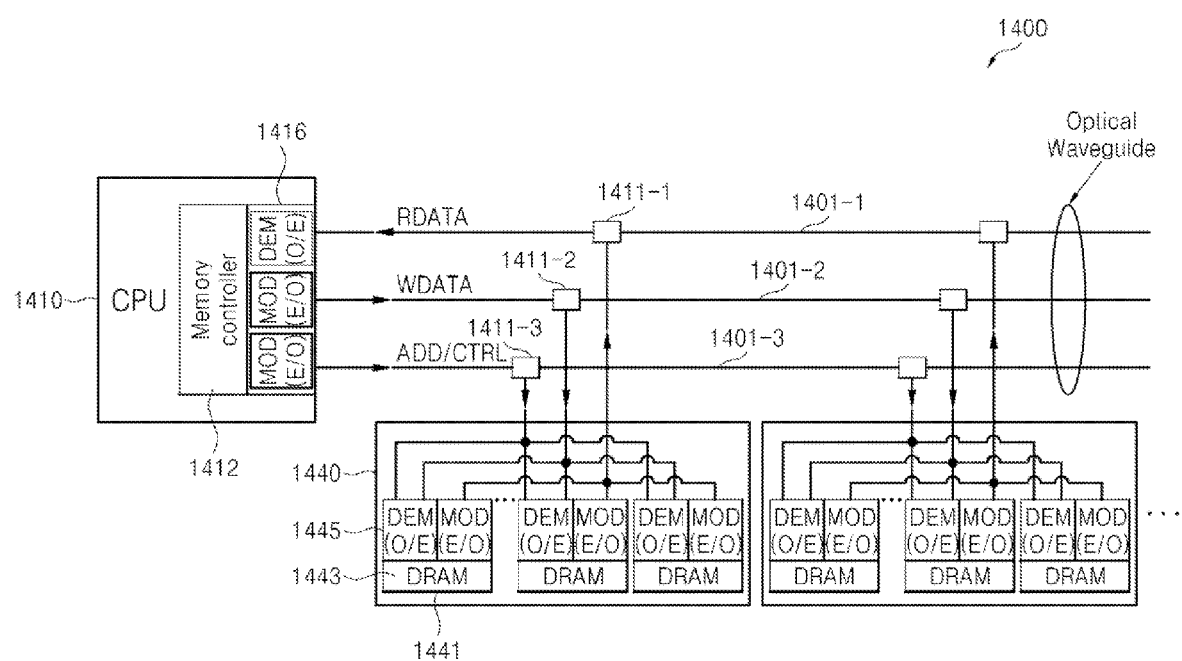
FIG. 9 is a block diagram of a data processing system including one of the optical modulators illustrated in FIGS. 4A through 6D according to exemplary embodiments of the present invention.

FIG. 9 is a block diagram of a data processing system including one of the optical modulators illustrated in FIGS. 4A through 6D according to exemplary embodiments of the present invention. In FIG. 9, MOD(E/O) denotes an optical modulator performing E/O conversion. The optical modulator MOD(E/O) may be implemented by one of the optical modulators 200, 200', 200", 300, 300', 300", 600, and 600' respectively illustrated in FIGS. 4A through 6D. Referring to FIG. 9, the data processing system 1400 includes a CPU 1410, a plurality of data buses 1401-1, 1401-2, and 1401-3, and a plurality of memory modules 1440. The data buses 1401-1 through 1401-3 transmit signals electrically or optically.

Each of the memory modules 1440 includes a plurality of memory devices 1441. Each of the memory devices 1441 includes a second optical transceiver 1445. Each memory device 1441 also includes a memory array 1443 including a plurality of memory cells, an access circuit (not shown) accessing the memory array 1443, and a logic control (not shown) controlling the operation of the access circuit.

The write operation of the data processing system 1400 is described below. It is assumed that addresses and control signals ADD/CTRL for the write operation have already been transmitted to at least one of the memory devices 1441 through the data bus 1401-3. The optical modulator MOD(E/O) included in a first optical transceiver 1416 included in the CPU 1410 transmits optical write data WDATA to an optical demodulator DEM(O/E) included in a second optical transceiver 1445 included in a first memory module 1440 through an optical coupler 1411-2 connected to the data bus 1401-2 under control of the memory controller 1412 included in the CPU 1410. The optical demodulator DEM(O/E) of the second optical transceiver 1445 demodulates the optical write data WDATA to generate a demodulated electrical signal. The access circuit writes the electrical signal to the memory array 1443 under control of the control logic.

The read operation of the data processing system 1400 is described below. It is assumed that addresses and control signals ADD/CTRL for the read operation have already been transmitted to at least one of the memory devices 1441 through the data bus 1401-3. The optical modulator MOD(E/O) included in the second optical transceiver 1445 of the memory device 1441 modulates an electrical signal output from the memory array 1443 into optical read data RDATA and transmits the optical read data RDATA to an optical demodulator DEM(O/E) included in the first optical transceiver 1416 of the CPU 1410 through an optical coupler 1411-1 connected to the data bus 1401-1. The optical demodulator DEM(O/E) of the first optical transceiver 1416 demodulates the optical read data RDATA into an electrical signal and outputs the electrical signal to the memory controller 1412.

Figure 10:
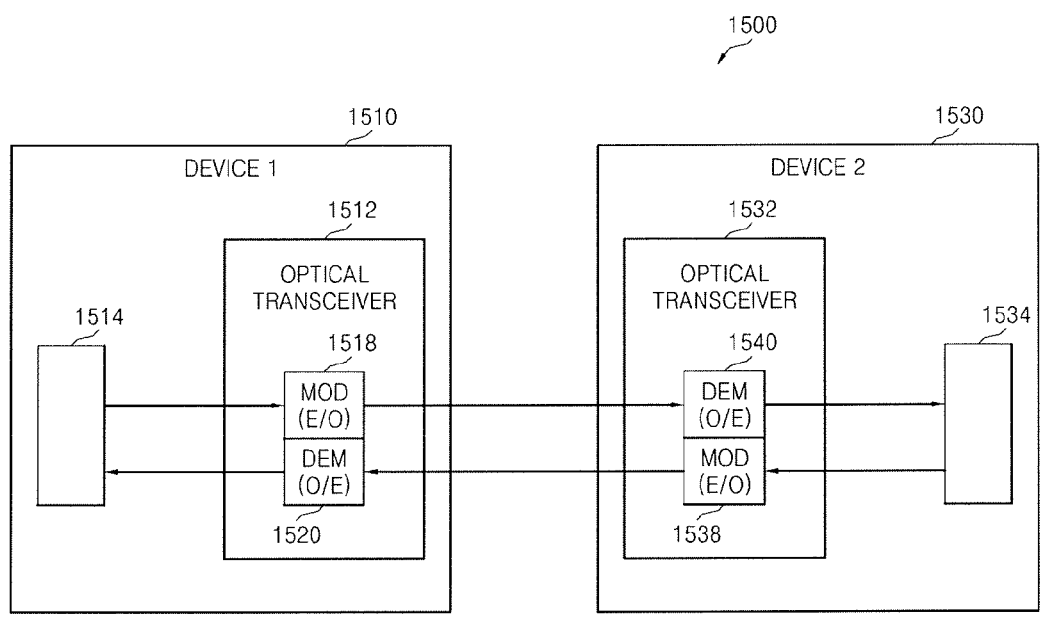
FIG. 10 is a block diagram of a data processing system including one of the optical modulators illustrated in FIGS. 4A through 6D according to exemplary embodiments of the present invention.

FIG. 10 is a block diagram of a data processing system including one of the optical modulators illustrated in FIGS. 4A through 6D according to exemplary embodiments of the present invention. Referring to FIG. 10, the data processing system 1500 includes a first device 1510 and a second device 1530. In FIG. 10, MOD(E/O) denotes an optical modulator that may be implemented by one of the optical modulators 200, 200', 200", 300, 300', 300", 600, and 600' respectively illustrated in FIGS. 4A through 6D.

The first device 1510 and the second device 1530 transmit and receive data using a serial communication protocol. The serial communication protocol may be a data communication protocol that supports a universal asynchronous receiver-transmitter (UART), serial peripheral interface (SPI), an inter-integrated circuit (I2C), a system management bus (SM-Bus), a controller area network (CAN), a universal serial bus (USB), an inter-chip (IC)-USB, camera serial interface defined by the mobile industry processor interface (MIPI®), display serial interface (DSI) defined by the MIPI®, mobile display digital interface (MDDI), or a local interconnect network (LIN).

Referring to FIG. 10, the first optical modulator 1518 included in a first optical transceiver 1512 included in the first device 1510 transmits a modulated optical signal through a data bus to a second optical demodulator 1540 included in a second optical transceiver 1532 included in the second device 1530 in compliance with a first microprocessor 1514 included in the first device 1510. The second optical demodulator 1540 demodulates the optical signal into an electrical signal. The second microprocessor 1534 included in the second device 1530 processes the electrical signal output from the second optical demodulator 1540. For example, the second microprocessor 1534 may write the electrical signal to a memory array during a write operation.

The second optical modulator 1538 included in the second optical transceiver 1532 of the second device 1530 transmits a modulated optical signal through a data bus to a first optical demodulator 1520 included in the first optical transceiver 1512 of the first device 1510 in compliance with the second microprocessor 1534. The first optical demodulator 1520 demodulates the optical signal into an electrical signal. The first microprocessor 1514 processes the electrical signal output from the first optical demodulator 1520. For example, the first microprocessor 1514 may process the electrical signal as read data during a read operation. Despite their names, the microprocessors 1514 and 1534 are processors that control the operations of the devices 1510 and 1530, respectively, e.g., the write operation and the read operation.

Figure 11:
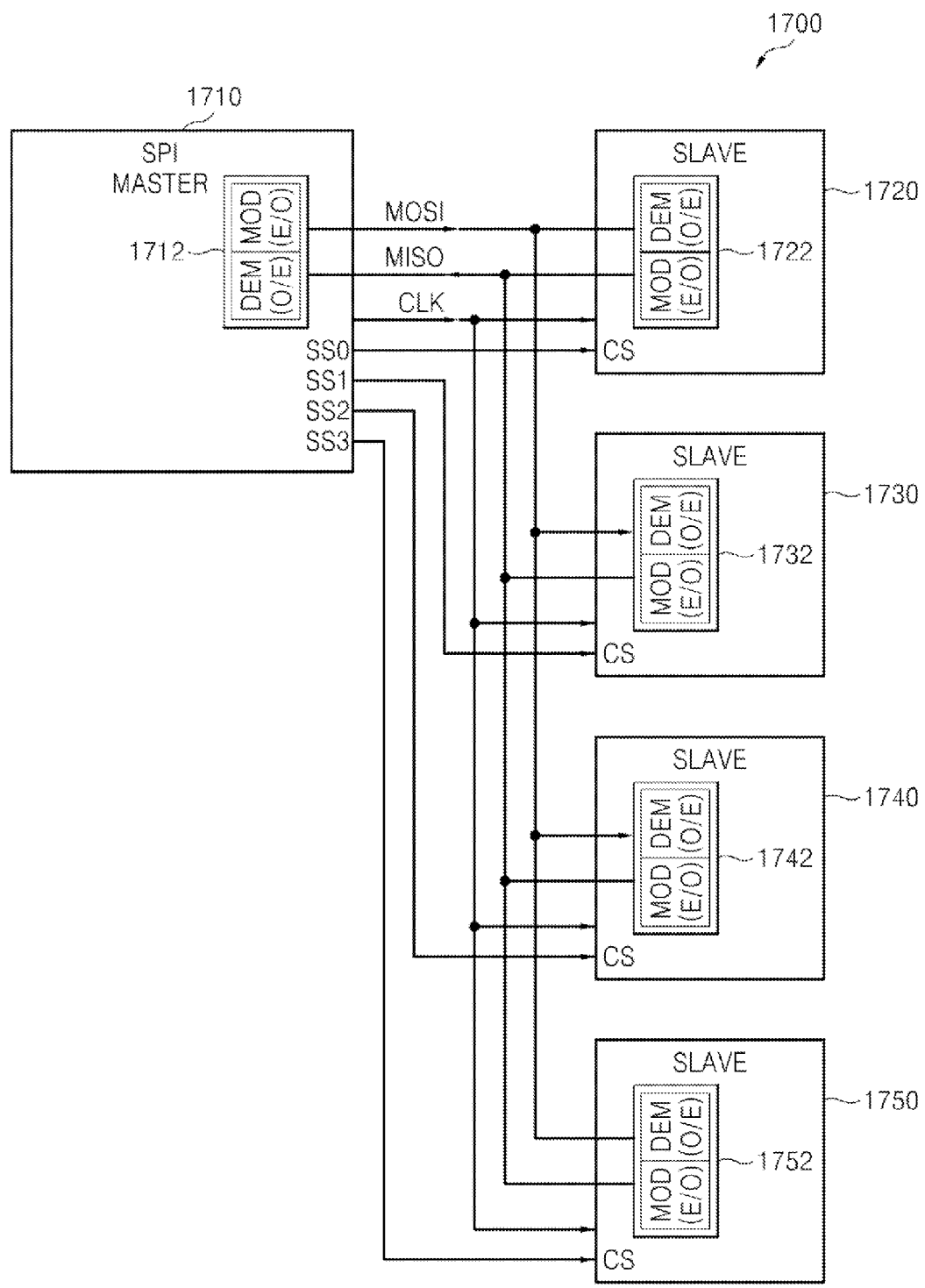
FIG. 11 is a block diagram of a data processing system including one of the optical modulators illustrated in FIGS. 4A through 6D according to exemplary embodiments of the present invention.

FIG. 11 is a block diagram of a data processing system including one of the optical modulators illustrated in FIGS. 4A through 6D according to exemplary embodiments of the present invention. The data processing system 1700 transmits and receives serial data using a SPI communication protocol and includes a SPI master 1710 and one or more SPI slaves 1720, 1730, 1740, and 1750. In FIG. 11, MOD(E/O) denotes an optical modulator that may be implemented by one of the optical modulators 200, 200', 200", 300, 300', 300", 600, and 600' respectively illustrated in FIGS. 4A through 6D. One of the SPI slaves 1720, 1730, 1740, and 1750 may be a shift register, a memory chip, a port expander, a display driver, a data converter, a printer, a data storage device, a sensor, or a microprocessor.

The first optical transceiver 1712 included in the SPI master 1710 transmits or receives an optical signal (e.g., a master-out slave-in (MOSI) signal or a master-in slave-out (MISO) signal) to or from each of second optical transceivers 1722, 1732, 1742, and 1752 respectively included in the SPI slaves 1720, 1730, 1740, and 1750 through an optical data bus. The SPI master 1710 includes a microprocessor (not shown) controlling the operation of the first optical transceiver 1712. Each of the SPI slaves 1720, 1730, 1740, and 1750 includes a microprocessor (not shown) controlling the operation of the second optical transceiver 1722, 1732, 1742, or 1752.

The first optical transceiver 1712 also transmits a serial clock signal CLK to the second optical transceivers 1722, 1732, 1742, and 1752 through an electrical or optical data bus. The SPI slaves 1720, 1730, 1740, and 1750 may be selected by chip selection signals SS0, SS1, SS2, and SS3, respectively. The chip selection signals SS0, SS1, SS2, and SS3 may be transmitted to the second optical transceivers 1722, 1732, 1742, and 1752, respectively, through electrical or optical data buses, respectively.

Figure 12:
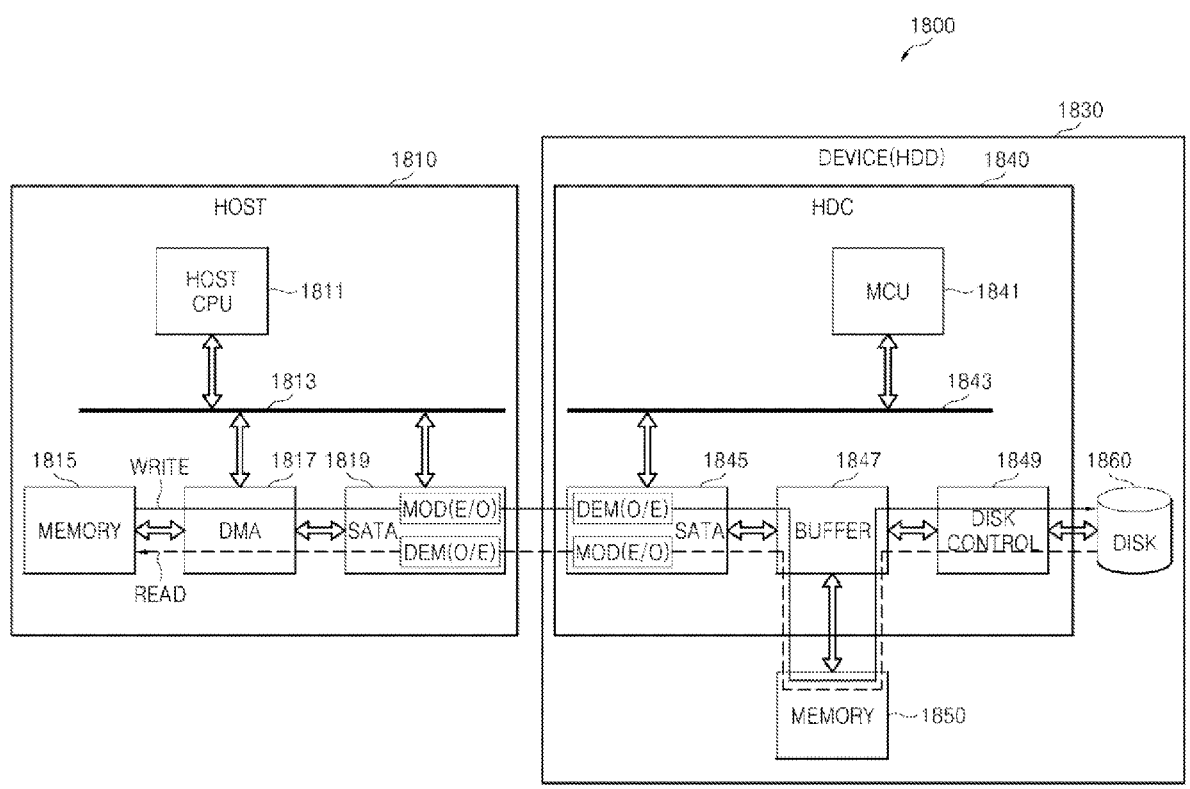
FIG. 12 is a block diagram of a data processing system including one of the optical modulators illustrated in FIGS. 4A through 6D according to exemplary embodiments of the present invention.

FIG. 12 is a block diagram of a data processing system including one of the optical modulators illustrated in FIGS. 4A through 6D according to exemplary embodiments of the present invention. The data processing system 1800 transmits and receives serial data using a serial advanced technology attachment (SATA) communication protocol and includes a SATA host 1810 and a SATA device 1830. In FIG. 12, MOD (E/O) denotes an optical modulator that may be implemented by one of the optical modulators 200, 200', 200", 300, 300', 300", 600, and 600' respectively illustrated in FIGS. 4A through 6D.

The SATA host 1810 includes a host CPU 1811, a data bus 1813, a memory 1815, a direct memory access (DMA) controller 1817, and a first STAT interface 1819. The host CPU 1811 controls the operation of the DMA controller 1817 or the first SATA interface 1819. The first SATA interface 1819 includes a first optical modulator MOD(E/O) and a first optical demodulator DEM(O/E). The SATA host 1810 may also include a controller controlling the operation of the first SATA interface 1819. The controller may be implemented within the first SATA interface 1819 or the host CPU 1811 may function as the controller.

The SATA device 1830 includes a hard disk controller (HDC) 1840, a memory 1850, and a magnetic recording medium 1860. The HDC 1840 includes a main control unit (MCU) 1841, a data bus 1843, a second SATA interface 1845, a buffer 1847, and a disk controller 1849. The MCU 1841 controls the operation of at least one of the second SATA interface 1845, the buffer 1847, and the disk controller 1849. The second SATA interface 1845 includes a second optical modulator MOD(E/O) and a second optical demodulator DEM(O/E). The SATA device 1830 may also include a controller controlling the operation of the second SATA interface 1845. The controller may be included within the second SATA interface 1845 or the MCU 1841 may function as the controller.

During a write operation, write data stored in the memory 1815 is transmitted to the first optical modulator MOD(E/O) of the first SATA interface 1819 in compliance with the control of the DMA controller 1817. The first optical modulator MOD(E/O) generates optical write data from the write data and transmits the optical write data to the second optical demodulator DEM(O/E) of the second SATA interface 1845 through a data bus. The second optical demodulator DEM(O/E) demodulates the optical write data into an electrical signal. The buffer 1847 buffers the electrical signal and temporarily stores the buffered electrical signal in the memory 1850. The disk controller 1849 reads the electrical signal from the memory 1850 and writes it to the magnetic recording medium 1860 designated by a write address.

During a read operation, the disk controller 1849 reads data from the magnetic recording medium 1860 designated by a read address and stores the read data in the memory 1850 through the buffer 1847. The second optical modulator MOD (E/O) of the second SATA interface 1845 generates optical read data from the read data received from the memory 1850 through the buffer 1847 and transmits the optical read data to the first optical demodulator DEM(O/E) of the first SATA interface 1819 through a data bus. The first optical demodulator DEM(O/E) demodulates the optical read data into an electrical signal. The DMA controller 1817 stores the electrical signal from the first optical demodulator DEM(O/E) in the memory 1815.

Figure 13:
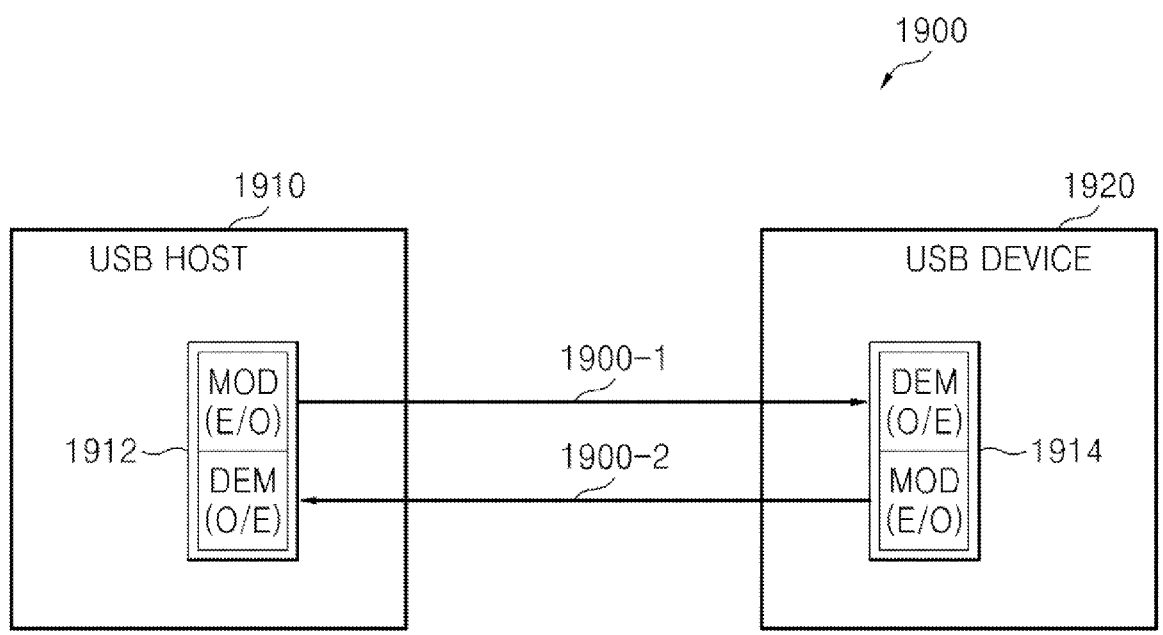
FIG. 13 is a block diagram of a data processing system including one of the optical modulators illustrated in FIGS. 4A through 6D according to exemplary embodiments of the present invention.

FIG. 13 is a block diagram of a data processing system including one of the optical modulators illustrated in FIGS. 4A through 6D according to exemplary embodiments of the present invention. The data processing system 1900 transmits and receives serial data using a USB communication protocol and includes a USB host 1910 and a USB device 1920. In FIG. 13, MOD(E/O) denotes an optical modulator that may be implemented by one of the optical modulators 200, 200', 200", 300, 300', 300", 600, and 600' respectively illustrated in FIGS. 4A through 6D.

An optical signal is generated by a first optical modulator MOD(E/O) included in a first optical transceiver 1912 included in the USB host 1910 and transmitted through a data bus 1900-1 to a second optical demodulator DEM(O/E) included in a second optical transceiver 1914 included in the USB device 1920. The second optical demodulator DEM(O/E) of the USB device 1920 demodulates the optical signal into an electrical signal. The USB host 1910 may also include a microcontroller (not shown) controlling the operation of the first optical transceiver 1912.

An optical signal is generated by a second optical modulator MOD(E/O) included in the second optical transceiver 1914 included in the USB device 1920 and transmitted through a data bus 1900-2 to a first optical demodulator DEM(O/E) included in the first optical transceiver 1912 of the USB host 1910. The first optical demodulator DEM(O/E) of the USB host 1910 demodulates the optical signal into an electrical signal. The USB device 1920 may also include a microcontroller (not shown) controlling the operation of the second optical transceiver 1914.

Figure 14:
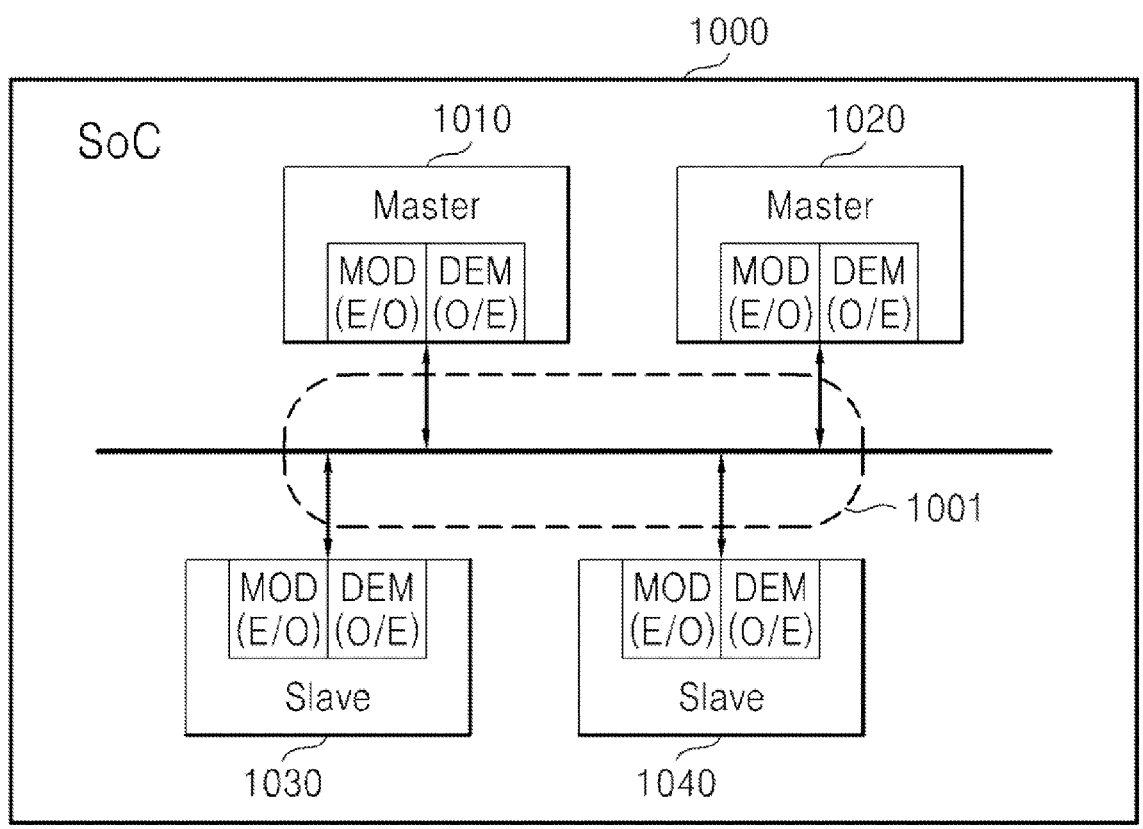
FIG. 14 is a block diagram of a data processing system including one of the optical modulators illustrated in FIGS. 4A through 6D according to exemplary embodiments of the present invention.

FIG. 14 is a block diagram of a data processing system 1000 including one of the optical modulators illustrated in FIGS. 4A through 6D according to exemplary embodiments of the present invention. The data processing system 1000 may be a system-on-chip (SoC) and includes a plurality of masters 1010 and 1020, a plurality of slaves 1030 and 1040, and a plurality of buses 1001. Each of the masters 1010 and 1020 and the slaves 1030 and 1040 includes an optical modulator MOD(E/O) and an optical demodulator DEM(O/E). Each of the buses 1001 may be implemented by an optical waveguide.

An optical signal generated by each optical modulator MOD(E/O) is transmitted to one optical demodulator DEM (O/E) through a corresponding one of the buses 1001 implemented by optical waveguides. The optical demodulator DEM(O/E) demodulates the optical signal into an electrical signal.

Figure 15:
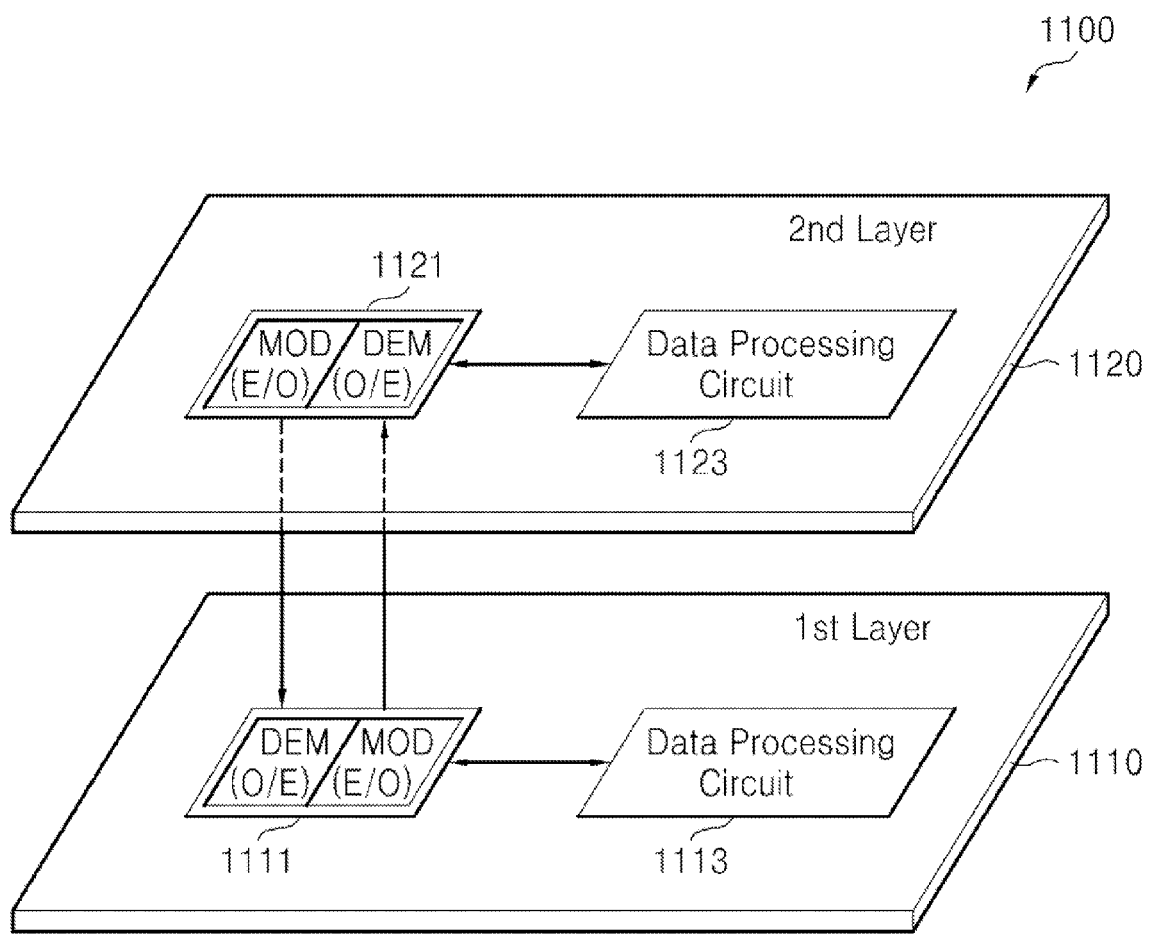
FIG. 15 is a block diagram of a data processing system including one of the optical modulators illustrated in FIGS. 4A through 6D according to exemplary embodiments of the present invention.

FIG. 15 is a block diagram of a data processing system including one of the optical modulators illustrated in FIGS. 4A through 6D according to exemplary embodiments of the present invention. The data processing system 1100 may have a stacked structure including a plurality of layers 1110 and 1120.

The first layer 1110 includes a first optical transceiver 1111 and a first data processing circuit 1113 controlling the operation of the first optical transceiver 1111. A first optical modulator MOD(E/O) included in the first optical transceiver 1111 transmits an optical signal to a second optical demodulator DEM(O/E) included in the second layer 1120 through an optical transmission element such as an optical waveguide, a through-silicon via (TSV), or optical fiber. The second optical demodulator DEM(O/E) demodulates the optical signal into an electrical signal. The electrical signal is processed by a second data processing circuit 1123 included in the second layer 1120.

The second optical modulator MOD(E/O) included in a second optical transceiver 1121 included in the second layer 1120 transmits an optical signal to a first optical demodulator DEM(O/E) included in the first layer 1110 through an optical transmission element such as an optical waveguide, a TSV, or optical fiber. The first optical demodulator DEM(O/E) demodulates the optical signal into an electrical signal. The electrical signal is processed by the first data processing circuit 1113.

FIGS. 16 through 19 are block diagrams of a data processing system including one of the optical modulators illustrated in FIGS. 4A through 6D according to exemplary embodiments of the present invention, respectively.

Figure 16:
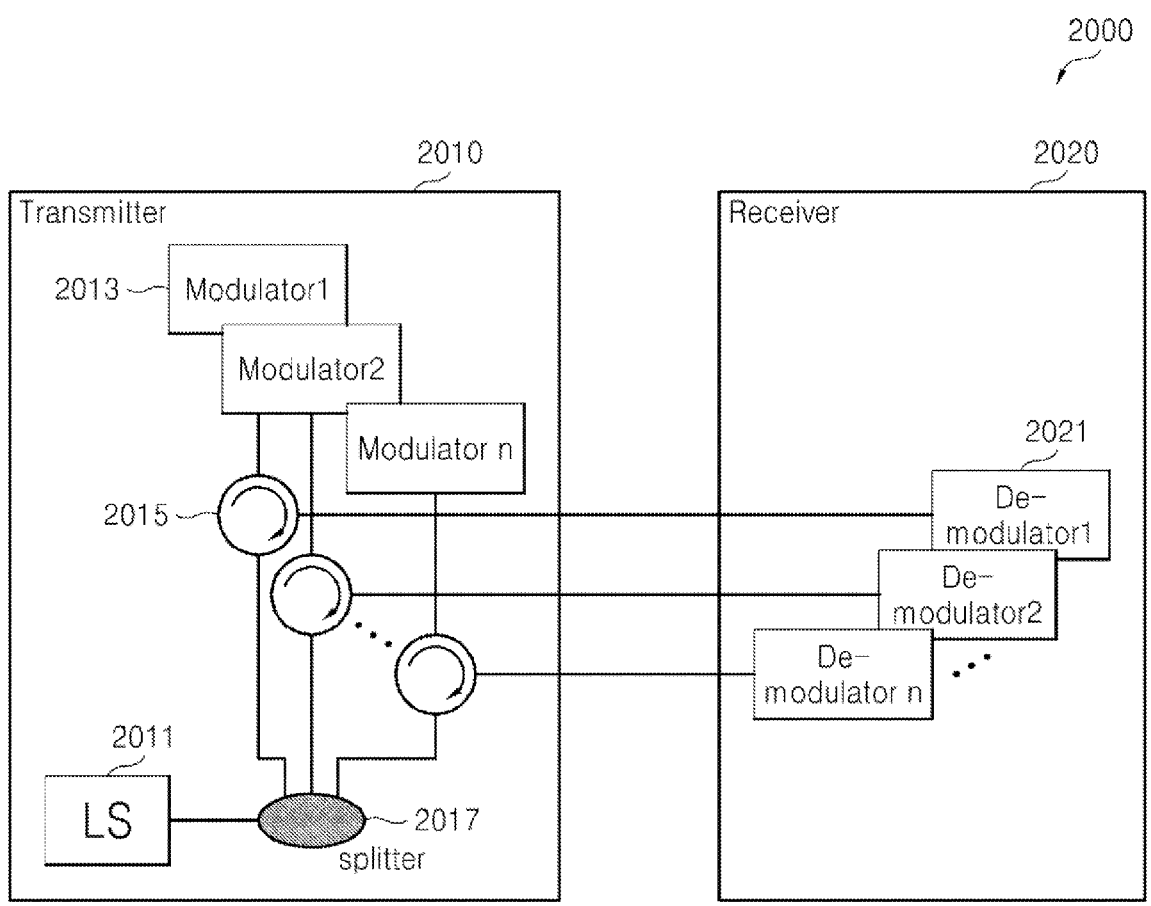
FIGS. 16 through 19 is a block diagram of a data processing system including one of the optical modulators illustrated in FIGS. 4A through 6D according to exemplary embodiments of the present invention, respectively.

Referring to FIG. 16, the data processing system 2000 includes a transmitter 2010 and a receiver 2020. The transmitter 2010 includes a light source 2011, a plurality of optical modulators 2013, a plurality of optical circulators 2015 and a splitter 2017. The receiver 2020 includes a plurality of optical demodulators 2021. A plurality of optical modulators 2013 may share one light source 2011.

The light source 2011 outputs an un-modulated optical signal. The splitter 2017 distributes an optical signal output from the light source 2011 to the plurality of optical modulators 2013. Each of the plurality of optical circulators 2015 receives the optical signal output from the splitter 2017 and transmits the received optical signal to a corresponding optical modulator 2013, and transmits a modulated optical signal output from the corresponding optical modulator 2013 to a corresponding optical demodulator 2021 in the receiver 2020.

Each of the plurality of optical modulators 2013 may be one of optical modulator (e.g., 300, 300', 300", 600, or 600' illustrated in FIGS. 5A through 6D) in which the input and the output of an optical signal are performed through the same terminal or port among the optical modulators 200, 200', 200", 300, 300', 300", 600, and 600' illustrated in FIGS. 4A through 6D.

Each of the optical demodulators 2021 in the receiver 2020 receives and demodulates an optical signal output from a corresponding optical modulator among the plurality of optical modulators 2013.

Figure 17:
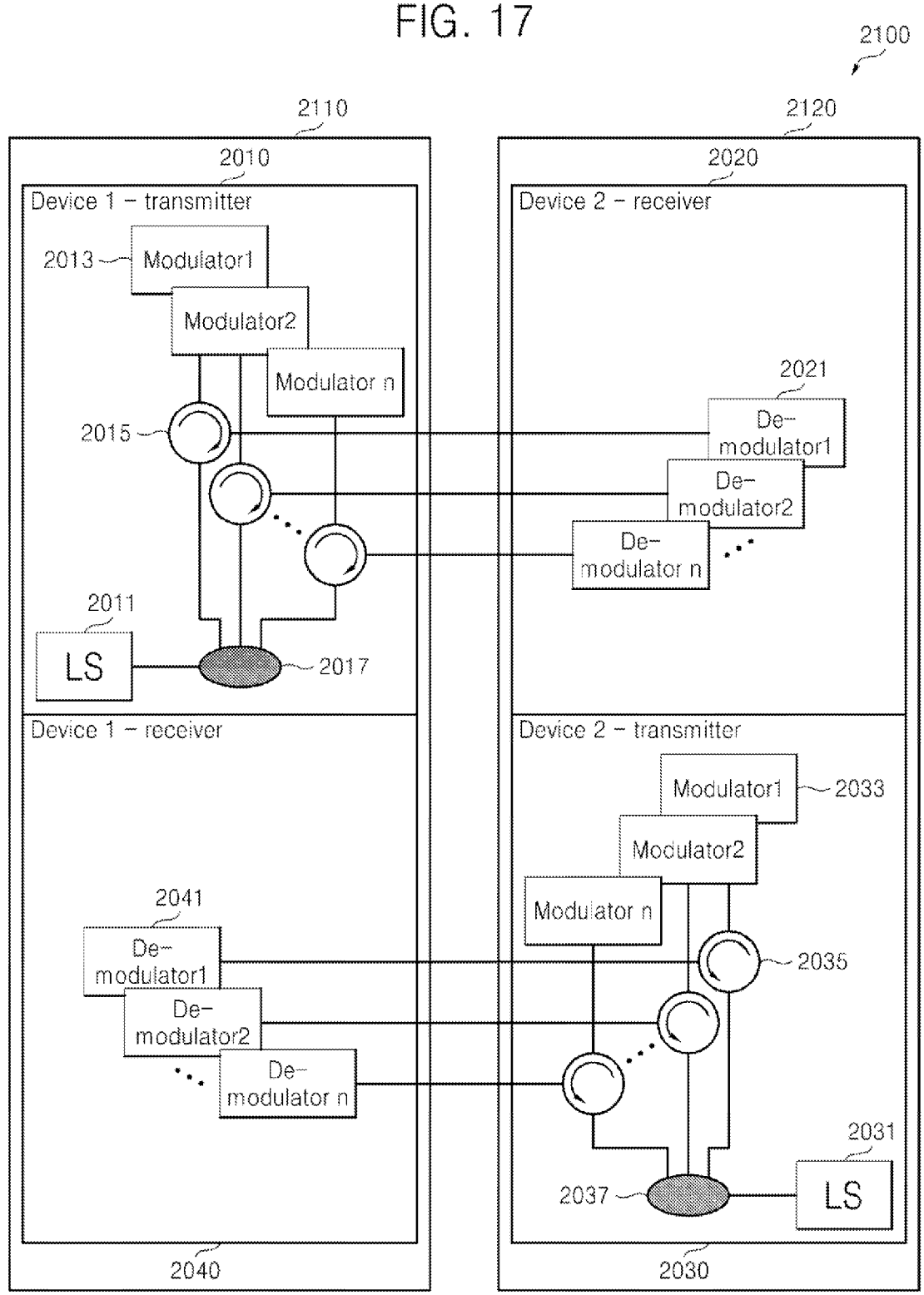

Referring to FIG. 17, the data processing system 2100 includes a first device 2110 and a second device 2120. The first device 2110 includes a first transmitter 2010 and a first receiver 2040. Similarly, the second device 2120 includes a second transmitter 2030 and a second receiver 2020. FIG. 17 illustrates an embodiment of the present invention, in which each of the devices 2110 and 2120 include both of a transmitter and a receiver.

The first transmitter 2010 modulates and transmits an optical signal, and then the second receiver 2020 receives and demodulates the signal from the first transmitter 2010. Similarly, the second transmitter 2030 modulates and transmits an optical signal, and then the first receiver 2040 receives and demodulates the signal from the second transmitter 2030.

The structure and the operations of the first and second transmitter 2010 and 2030 illustrated in FIG. 17 are similar to those of the transmitter 2010 illustrated in FIG. 16, and the structure and the operations of the first and second receiver 2040 and 2020 illustrated in FIG. 17 are similar to those of the receiver 2020 illustrated in FIG. 16. Thus, description about them will be skipped.

Figure 18:
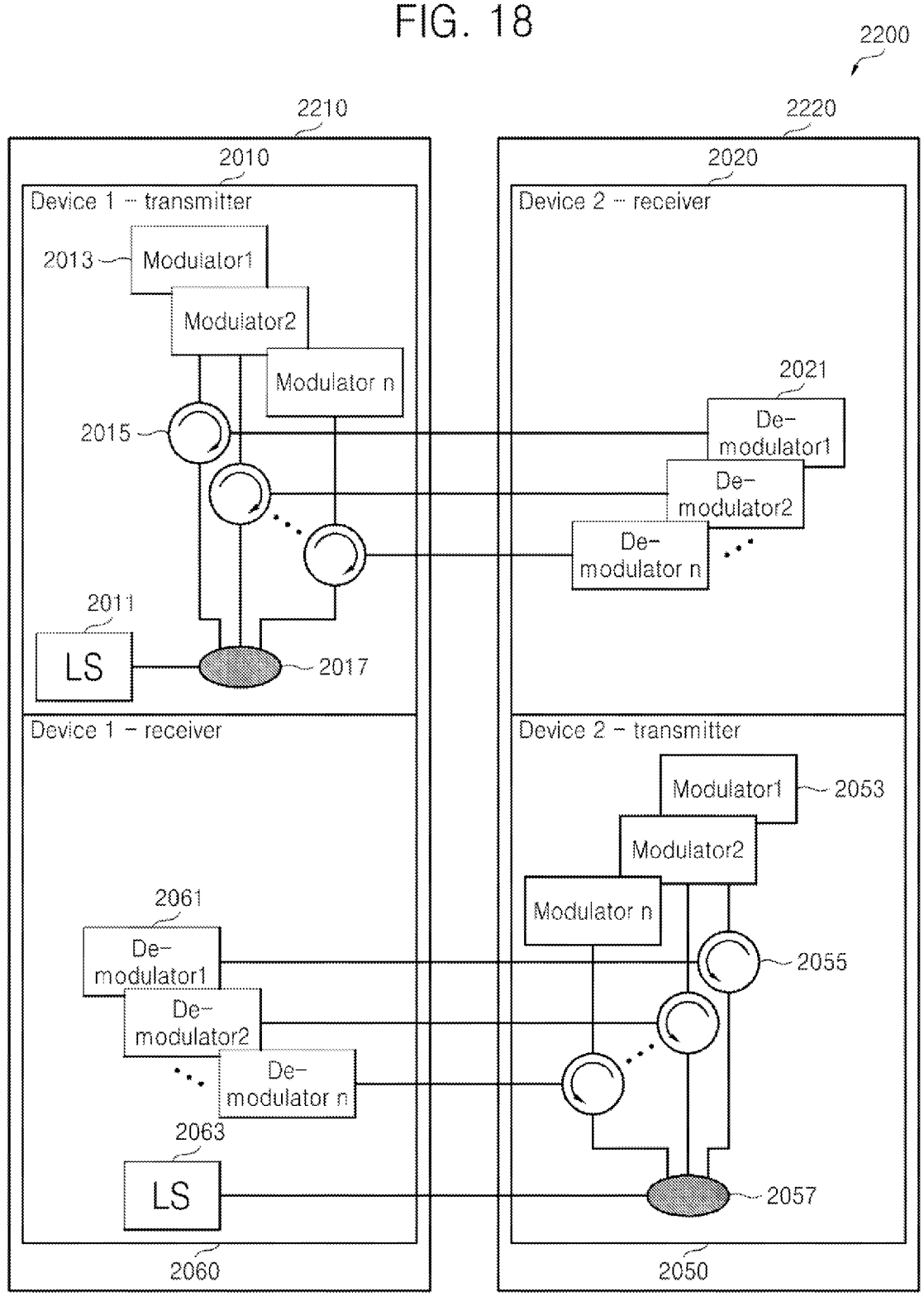

Referring to FIG. 18, the data processing system 2200 includes a first device 2210 and a second device 2220. The structure and the operations of the data processing system 2200 illustrated in FIG. 18 are similar to those of the data processing system 2100 illustrated in FIG. 17. Thus, description will be focused on differences between the two data processing systems 2100 and 2200 to avoid redundancy.

As shown in FIG. 17, each of the transmitters 2010 and 2030 includes the individual light source 2011 and 2031, while a light source 2063 for the second device 2220 is located in a transmitter 2010 or a receiver 2060 of the first device 2210, or a part outside of the transmitter 2010 and the receiver 2060.

However, as shown in FIG. 18, the light sources are located in the first device 2210 only (for example, a controller or a CPU), and a light source is not located in the second device 2220 (for example, a memory device). An optical signal output from the light source 2063 for the second device 2220 located in the first device 2210 is transmitted to the transmitter 2050 of the second device 2020.

Thus, the transmitter 2050 of the second device 2020 receives and modulates an optical signal output from an un-modulated optical signal from the first device 2210, and transmits the modulated optical signal to the transmitter 2010 of the first device 2210.

Figure 19:
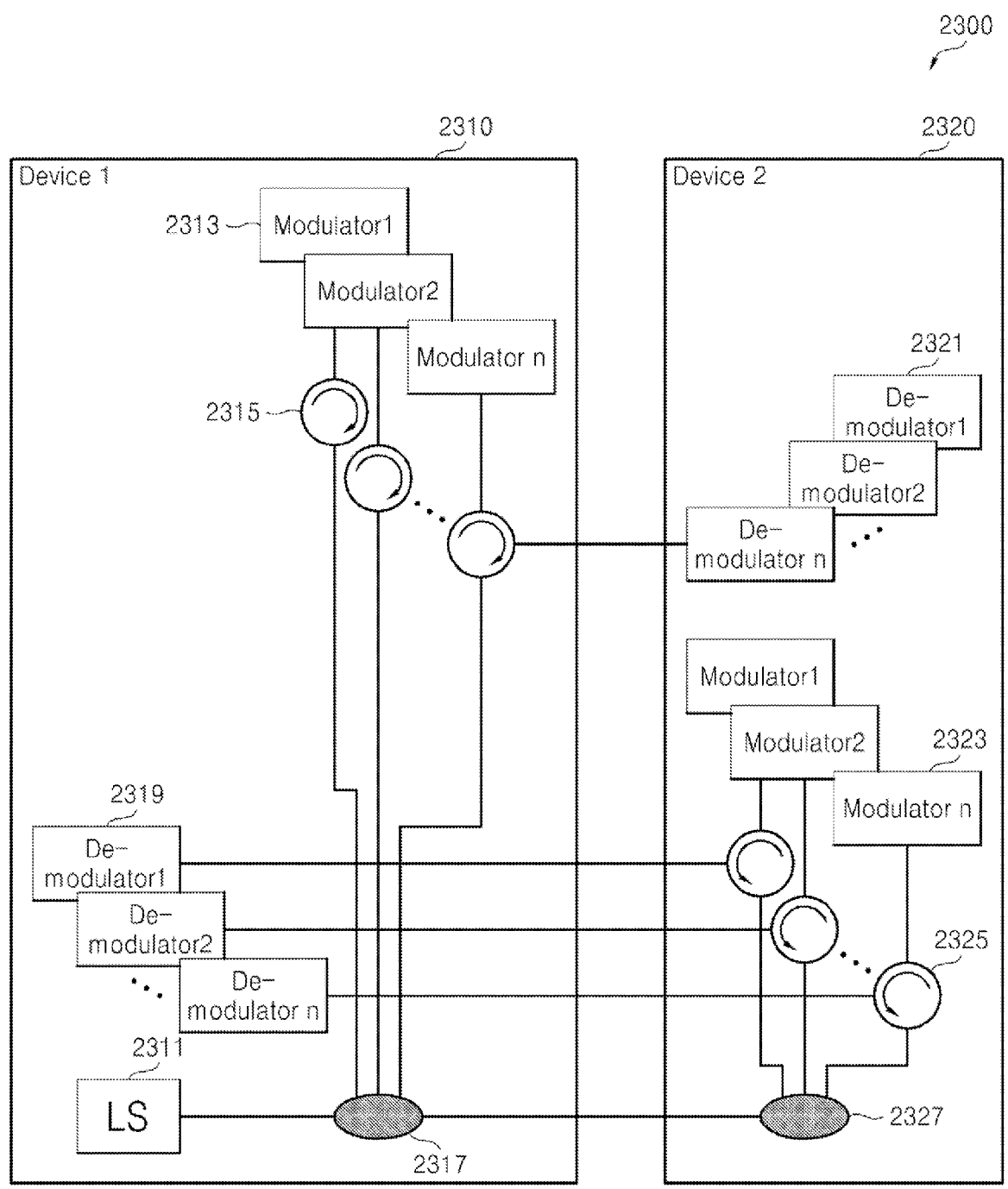

Referring to FIG. 19, the data processing system 2300 includes a first device 2310 and a second device 2320. The structure and the operations of the data processing system 2300 illustrated in FIG. 19 are similar to those of the data processing system 2200 illustrated in FIG. 18. Thus, description will be focused on differences between the two data processing systems 2100 and 2200 to avoid redundancy.

In the embodiment of the present invention illustrated in FIG. 18, each of the light source 2011 for the first device 2210 and the light source 2063 for the second device 2220 is individually provided in the first device 2210, while a light source 2311 is provided in only one of a first device 2310 and a second device 2320 in the embodiment of the present invention illustrated in FIG. 19. Thus, the first device 2310 and the second device 2320 share the light source 2311. In the embodiment of the present invention illustrated in FIG. 19, the light source is located in the first device 2310 only, but the present invention is not restricted there-to. For example, the light source may be located in the second device 2320 or outside of the first and second devices 2310 and 2320.

In the above-described embodiments, an electrical signal may be either a serial or a parallel electrical signal or either serial or parallel data.

The above-described data processing systems according to exemplary embodiments of the present invention are focused on systems using a serial interface. But, an optical modulator according to exemplary embodiments of the present invention may be applied to a data processing system using a parallel interface as well as a data processing system using a serial interface.

While the present invention has been particularly shown and described with reference to exemplary embodiments thereof, it will be understood by those of ordinary skill in the art that various changes in forms and details may be made therein. In the drawings, elements may be omitted or exaggerated or may have different sizes than actual sizes. For example, each of the reflective grating couplers 330, 340, 620, 630, 640, 650, 620', and 640' illustrated in FIGS. 5A through 6D may be implemented to have a width similar to that of an optical waveguide, but they are illustrated to have greater widths than optical waveguides in the drawings.

What is claimed is:

1. An optical modulator comprising:
a light input unit configured to receive an incident optical signal which has not been modulated, to split the incident optical signal into a first optical signal and a second optical signal, and to transmit the first and second optical signals to a first path of an optical waveguide and a second path of the optical waveguide, respectively;
a first phase shifter positioned in path and configured to shift a phase of the first optical signal by a first angle in response to a first electrical signal;
a second phase sifter positioned in the second path and configured to shift a phase of the second optical signal by a second angle in response to a second electrical signal; and
a light output unit configured to combine a signal received through the first path and a signal received through the second path and to generate an output optical signal therefrom,
wherein at least one unit among the light input unit and the light output unit comprises a vertical grating coupler,
wherein the light input unit comprises:
a slanted grating coupler configured to receive the incident optical signal and to transmit the received optical signal in one direction; and
a Y-splitter configured to split the incident optical signal received from the slanted grating coupler into both the direction of the first path and the direction of the second path of the optical waveguide with equivalent proportions, and
wherein the light output unit comprises a vertical grating coupler configured to combine the second optical signal with a phase-modulated signal output from the first phase shifter and to output the output optical signal in a direction vertical to a direction in which the second optical signal and the phase-modulated signal are input to the light output unit.

2. The optical modulator of claim 1, wherein the light input unit comprises a first vertical grating coupler configured to receive the incident optical signal in a direction perpendicular to both the direction of the first path and the direction of the second path of the optical waveguide and to transmit the first optical signal and the second optical signal in both the direction of the first path and the direction of the second path of the optical waveguide, respectively, with equivalent proportions.

3. The optical modulator of claim 1, wherein the light input unit comprises a first vertical grating coupler configured to receive the incident optical signal in a direction perpendicular to both the direction of the first path and the direction of the second path of the optical waveguide and to transmit the first optical signal and the second optical signal in both the direction of the first path and the direction of the second path of the optical waveguide, respectively, with different proportions.

4. The optical modulator of claim 1, wherein the light output unit comprises a second vertical grating coupler configured to combine the second optical signal with a phase-modulated signal output from the first phase shifter and to output the output optical signal in a direction perpendicular to a direction in which the second optical signal and the phase-modulated signal are input to the light output unit.

5. The optical modulator of claim 1, wherein the light output unit comprises:
a Y-coupler configured to combine the second optical signal with a phase-modulated signal output from the first phase shifter; and
a slanted grating coupler configured to output an output signal of the Y-coupler in a direction slanting with a predetermined angle from a direction perpendicular to both the direction of the first path and the direction of the second path of the optical waveguide.

6. An optical modulator comprising:
a light input/output unit configured to receive an incident optical signal which has not been modulated, to split the incident optical signal into a first optical signal and a second optical signal, and to transmit the first and second optical signals to a first path of an optical waveguide and a second path of the optical waveguide, respectively;
a phase shifter positioned in at least one of the first and second paths, configured to modulate a phase of at least one of the first and second optical signals, which have been received through the first and second paths, respectively, in response to an electrical signal, and configured to output a phase-modulated signal; and
a reflective grating coupler configured to reflect a signal received through the first path back along the first path and to reflect a signal received through the second path back along the second path,
wherein the light input/output unit combines a reflected signal received through the first path and a reflected signal received through the second path and outputs a combined signal, and
wherein the electrical signal comprises a first electrical signal, and
the phase shifter comprises a first phase shifter configured in the first path and configured to shift the phase of the first optical signal by a first angle in response to the first electrical signal.

7. The optical modulator of claim 6, wherein the electrical signal further comprises a second electrical signal, and
the phase shifter further comprises a second phase shifter positioned in the second path and configured to shift the phase of the second optical signal by a second angle in response to the second electrical signal.

8. The optical modulator of claim 6, wherein the first phase shifter modulates a phase of a first phase-modulated signal reflected by the reflective grating coupler and outputs a second phase-modulated signal.

9. The optical modulator of claim 8, wherein the light input/output unit comprises a vertical grating coupler configured to receive the incident optical signal in a direction perpendicular to a direction in which the optical signal is output to the optical waveguide and to transmit the first optical signal and the second optical signal in the first path and the second path, respectively, of the optical waveguide at a predetermined ratio and configured to combine the second optical signal reflected by the reflective grating coupler with the second phase-modulated signal and to output the combined signal in a direction perpendicular to a direction in which the signals have been input from the optical waveguide.

10. The optical modulator of claim 9, wherein the light input/output unit comprises:
   a slanted grating coupler configured to receive the incident optical signal and transmit it in one direction; and
   a Y-splitter configured to split the incident optical signal received from the slanted grating coupler into the first and second paths at the predetermined ratio, wherein the Y-splitter combines the second optical signal reflected by the reflective grating coupler with the second phase-modulated signal and outputs the combined signal, and wherein the slanted grating coupler outputs the combined signal from the Y-coupler in a direction slanging with a predetermined angle from the direction perpendicular to the direction in which the signals have been input from the optical waveguide.

11. An optical modulator comprising:
   a light input unit configured to receive an incident optical signal which has not been modulated and to split the incident optical signal into a first optical signal and a second optical signal;
   a first phase shifter configured to modulate a phase of the first optical signal by a first angle in response to a first electrical signal, wherein the first phase shifter does not modulate the second optical signal;
   a second phase shifter configured to modulate a phase of the second optical signal by a second angle in response to a second electrical signal, wherein the second phase shifter does not the first optical signal; and
   a light output unit configured to combine the phase modulated first optical signal and the second optical signal,
   wherein the light input unit comprises:
   a slanted grating coupler configured to receive the incident optical signal and to transmit the received optical signal in one direction; and
   a Y-splitter configured to split the incident optical signal received from the slanted grating coupler into both the direction of the first path and the direction of the second path of the optical waveguide with equivalent proportions, and
   wherein the light output unit comprises a vertical grating coupler configured to combine the second optical signal with a phase-modulated signal output from the first phase shifter and to output the output optical signal in a direction vertical to a direction in which the second optical signal and the phase-modulated signal are input to the light output unit.

* * * * *